United States Patent
Doihara et al.

(10) Patent No.: US 7,258,025 B2
(45) Date of Patent: Aug. 21, 2007

(54) CORIOLIS FLOWMETER

(75) Inventors: Ryoji Doihara, Ibaraki-ken (JP); Masaki Takamoto, Ibaraki-ken (JP); Yoshiya Terao, Ibaraki-ken (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 64 days.

(21) Appl. No.: 10/556,678

(22) PCT Filed: May 12, 2004

(86) PCT No.: PCT/JP2004/006397

§ 371 (c)(1),
(2), (4) Date: Nov. 14, 2005

(87) PCT Pub. No.: WO2004/099733

PCT Pub. Date: Nov. 18, 2004

(65) Prior Publication Data

US 2007/0034019 A1    Feb. 15, 2007

(30) Foreign Application Priority Data

May 12, 2003 (JP) ............................ 2003-133362
Apr. 15, 2004 (JP) ............................ 2004-119950

(51) Int. Cl.
*G01F 1/84* (2006.01)
(52) U.S. Cl. ................................. 73/861.355
(58) Field of Classification Search ........... 73/861.357, 73/861.355, 861.356
See application file for complete search history.

(56) References Cited

U.S. PATENT DOCUMENTS

| 5,323,658 A * | 6/1994 | Yao et al. .............. 73/861.357 |
| 6,006,609 A * | 12/1999 | Drahm et al. .......... 73/861.357 |
| 6,647,807 B2 * | 11/2003 | Drahm et al. .......... 73/861.357 |

FOREIGN PATENT DOCUMENTS

| JP | 7-72693 B | 8/1995 |
| JP | 9-15015 A | 1/1997 |
| JP | 2001-241987 A | 9/2001 |

* cited by examiner

*Primary Examiner*—Jewel Thompson
(74) *Attorney, Agent, or Firm*—Sughrue Mion, PLLC

(57) ABSTRACT

When outputs from two vibration detection sensors are measured by a Coriolis flowmeter in a form of phase difference time, a tube must be thinned to increase a sensitivity of the flowmeter to enable measurement and accordingly flow velocity and pressure loss increase, and a thickness of the flowmeter must be reduced and therefore a pressure resistance cannot be readily enhanced. In particular, the sensitivity of signals to flow rate is difficult to increase and, accordingly, a flow rate of a low-density gas cannot be accurately measured. In the present invention, a Coriolis vibration frame 16 carrying a U-shaped tube is swingably fixed to a forced vibration frame 19 fixed to a support base 22 to form a highly rigid frame structure limiting a vibrating direction to one degree of freedom in a Coriolis vibration direction. The forced vibration frame 19 is vibrated by a vibration exciter 20 so that a ratio of a forced vibration frequency to the Coriolis frequency of a pipeline is at least 1 to 10. The ratio of the amplitude of the forced vibration to the amplitude of the Coriolis vibration is calculated based on signals from two vibration sensors such as acceleration sensors 17 and 18 to measure the mass flow rate of a fluid flowing in the pipeline.

21 Claims, 12 Drawing Sheets

Fig. 1

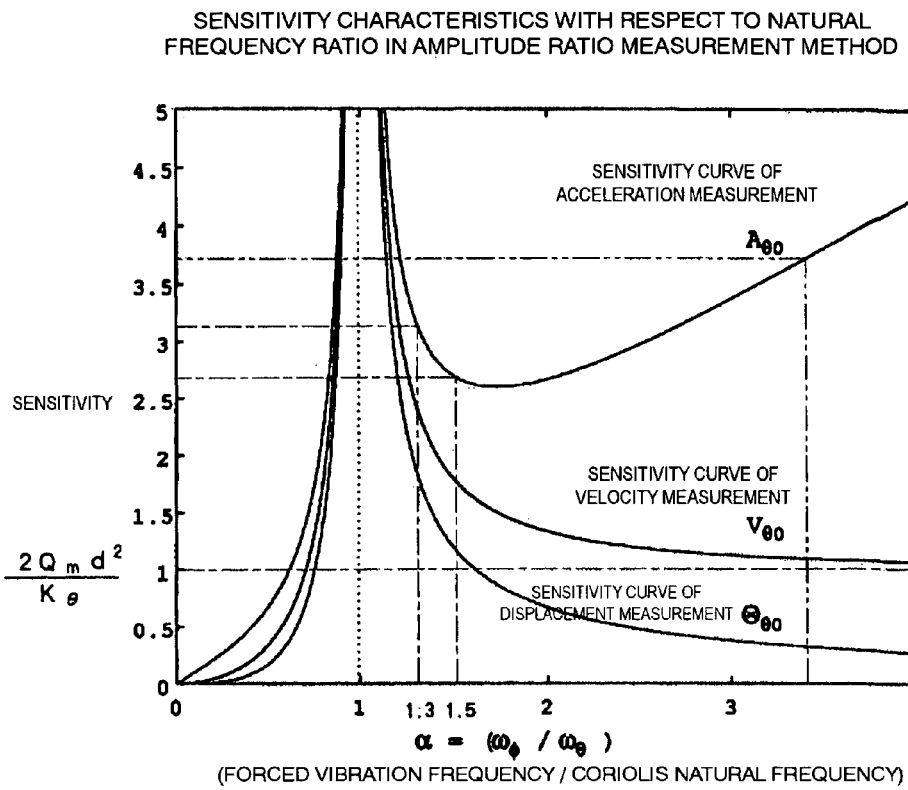

SENSITIVITY CHARACTERISTICS WITH RESPECT TO NATURAL FREQUENCY RATIO IN AMPLITUDE RATIO MEASUREMENT METHOD

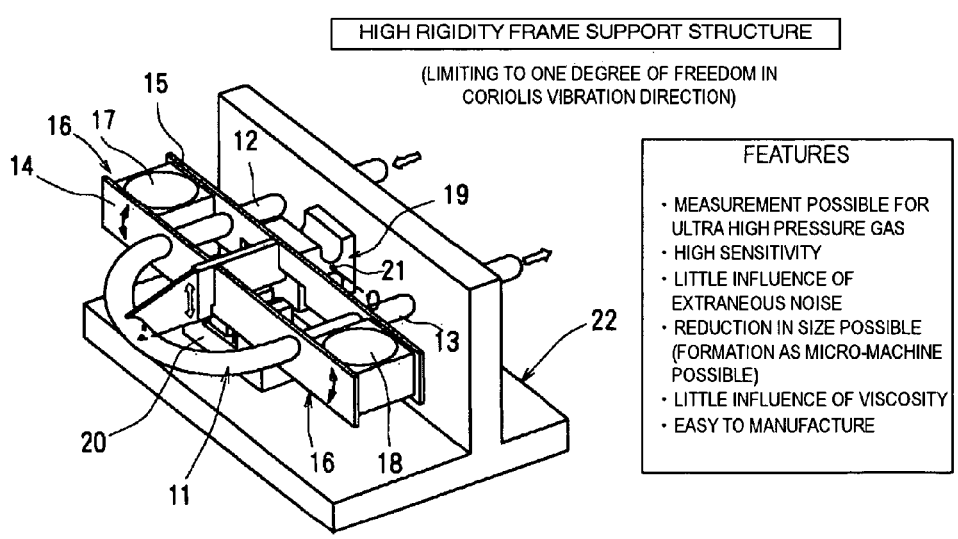

HIGH RIGIDITY FRAME SUPPORT STRUCTURE (LIMITING TO ONE DEGREE OF FREEDOM IN CORIOLIS VIBRATION DIRECTION)

FEATURES

- MEASUREMENT POSSIBLE FOR ULTRA HIGH PRESSURE GAS
- HIGH SENSITIVITY
- LITTLE INFLUENCE OF EXTRANEOUS NOISE
- REDUCTION IN SIZE POSSIBLE (FORMATION AS MICRO-MACHINE POSSIBLE)
- LITTLE INFLUENCE OF VISCOSITY
- EASY TO MANUFACTURE

Fig. 5
(a)
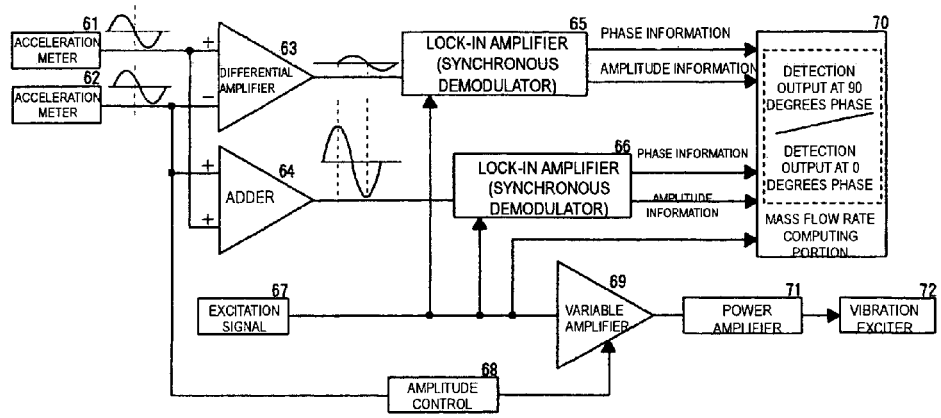
(b)
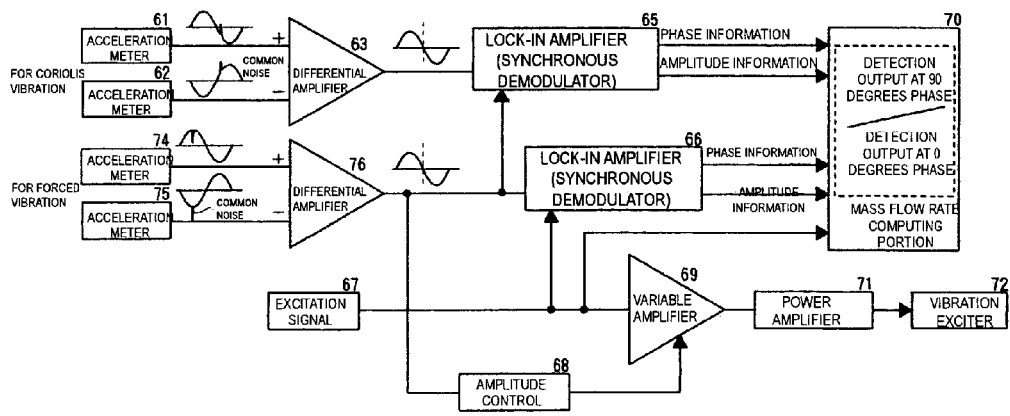

Fig. 6
(a) SENSITIVITY CHARACTERISTICS AS OBTAINED BY VELOCITY MEASUREMENT
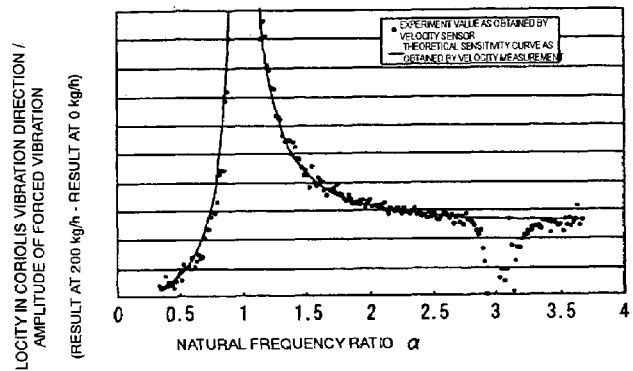
(b) SENSITIVITY CHARACTERISTICS AS OBTAINED BY ACCELERATION MEASUREMENT
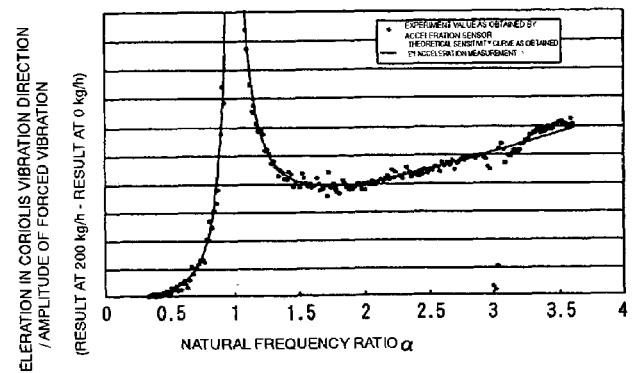
(c) MOMENT OF INERTIA AND SENSITIVITY CHARACTERISTICS (NATURAL FREQUENCY RATIO α IS FIXED: α=2.7)
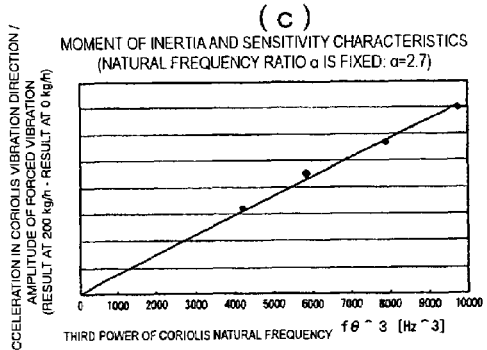
(d) SPRING CONSTANT AND SENSITIVITY CHARACTERISTICS (NATURAL FREQUENCY RATIO α IS FIXED) α IS FIXED: α=2.7)
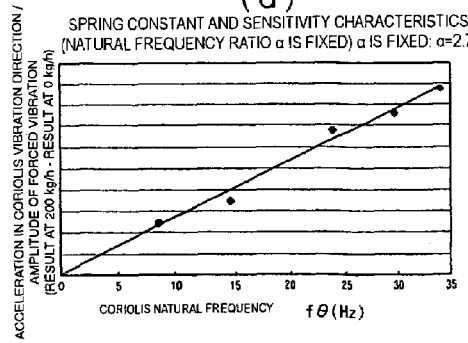

Fig. 7
(a)
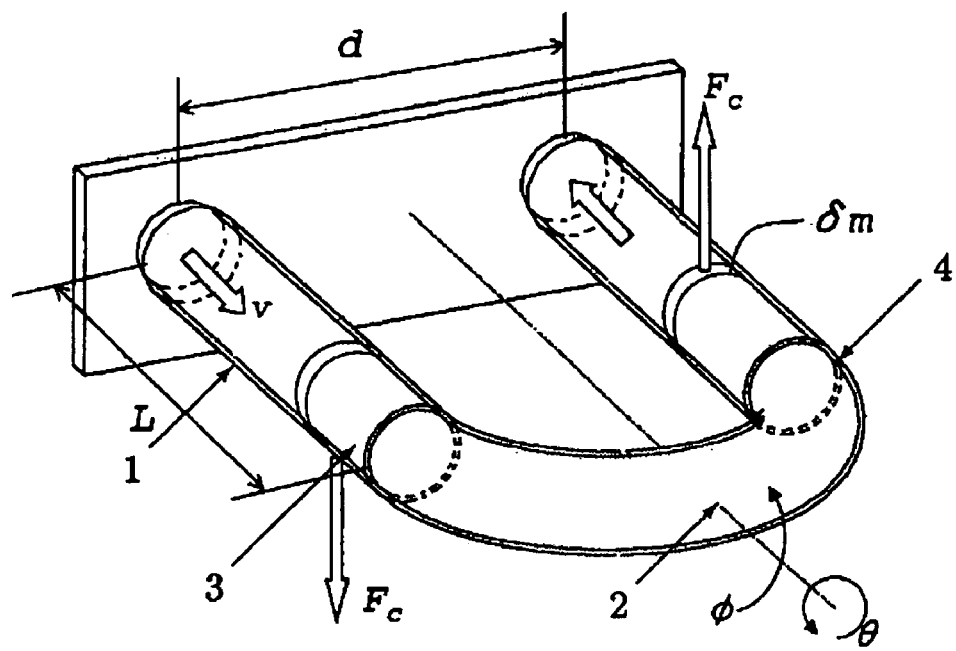
(b)
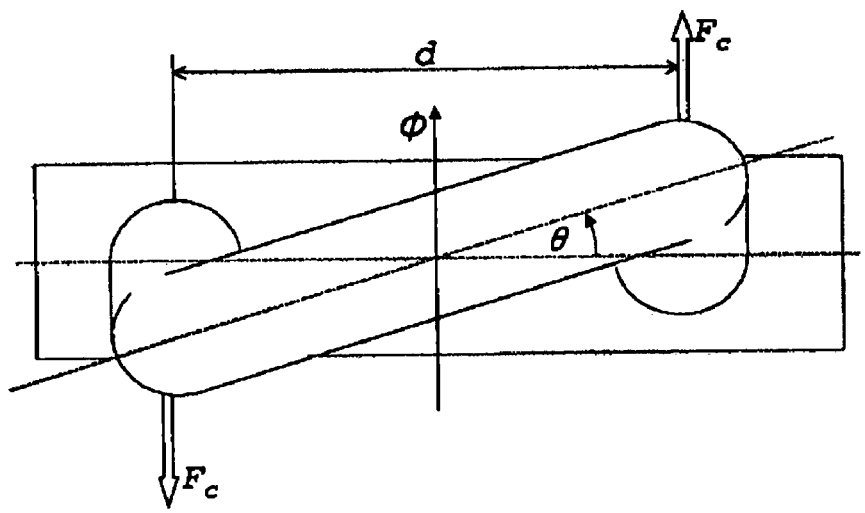

Fig. 9
(a)
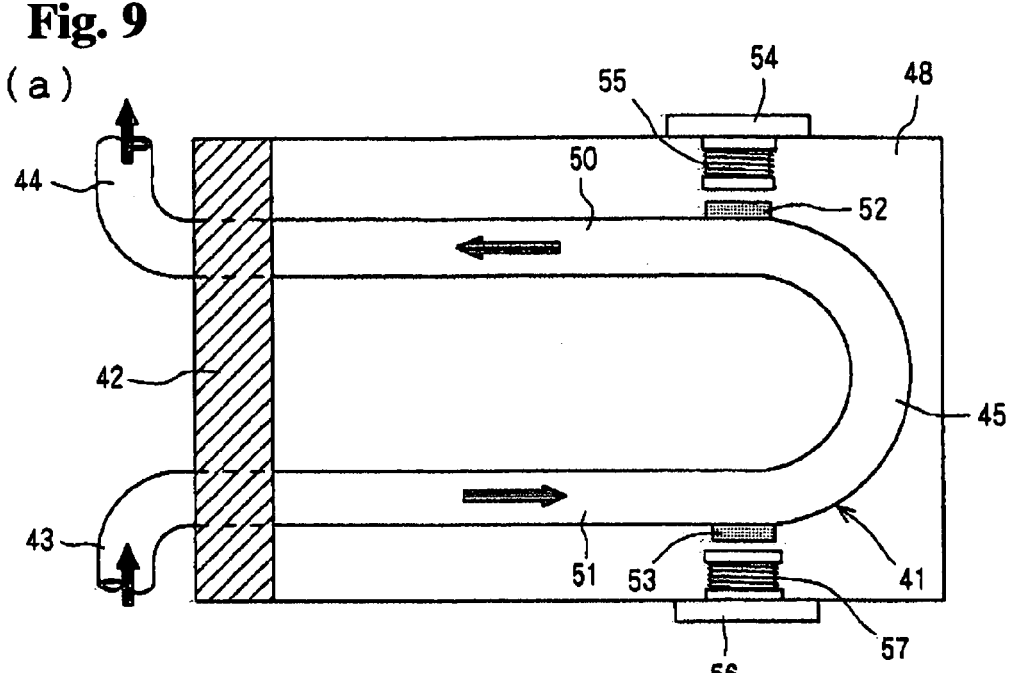
(b)
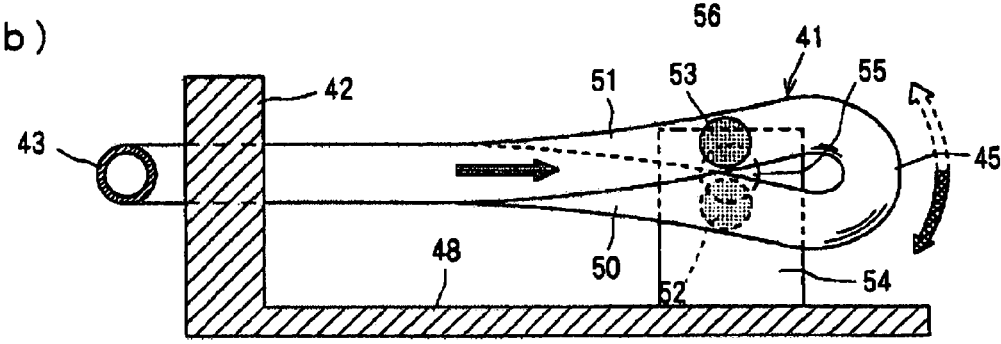
(c)
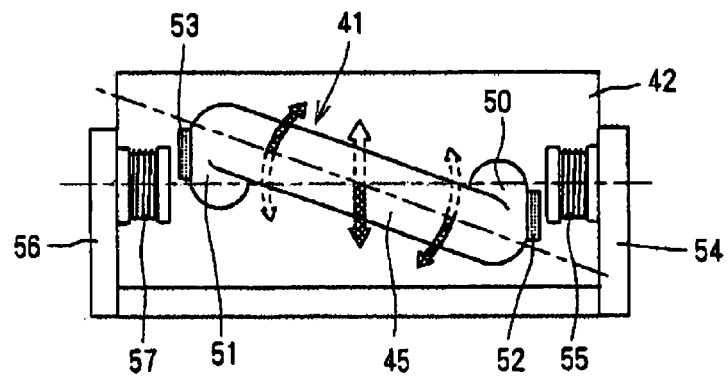

Fig. 10
(a)
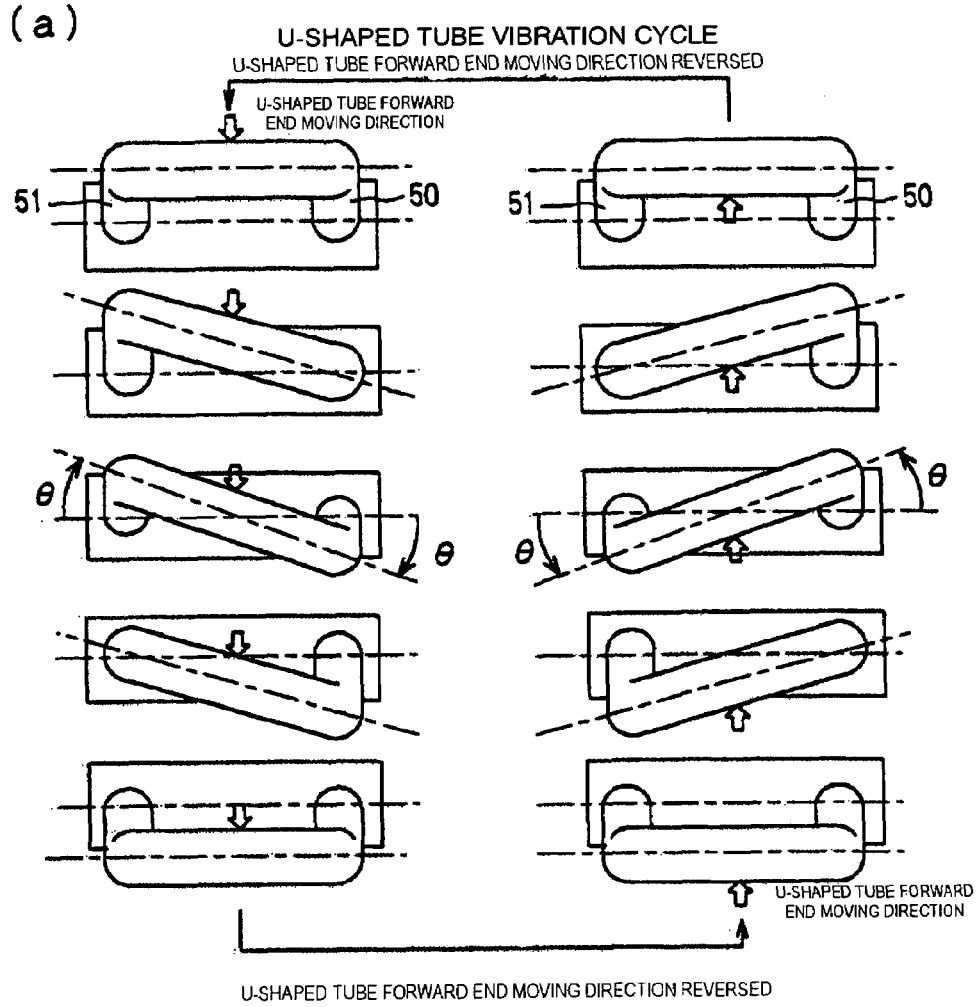
(b)
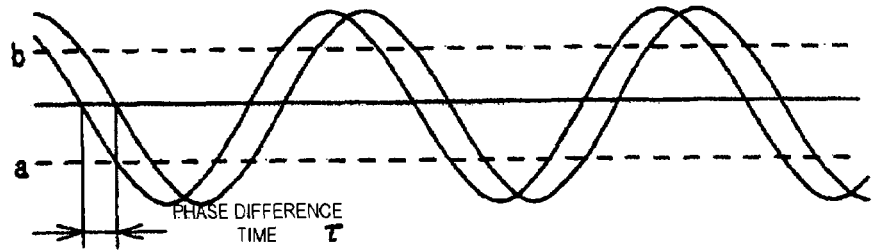

Fig. 11
(a)
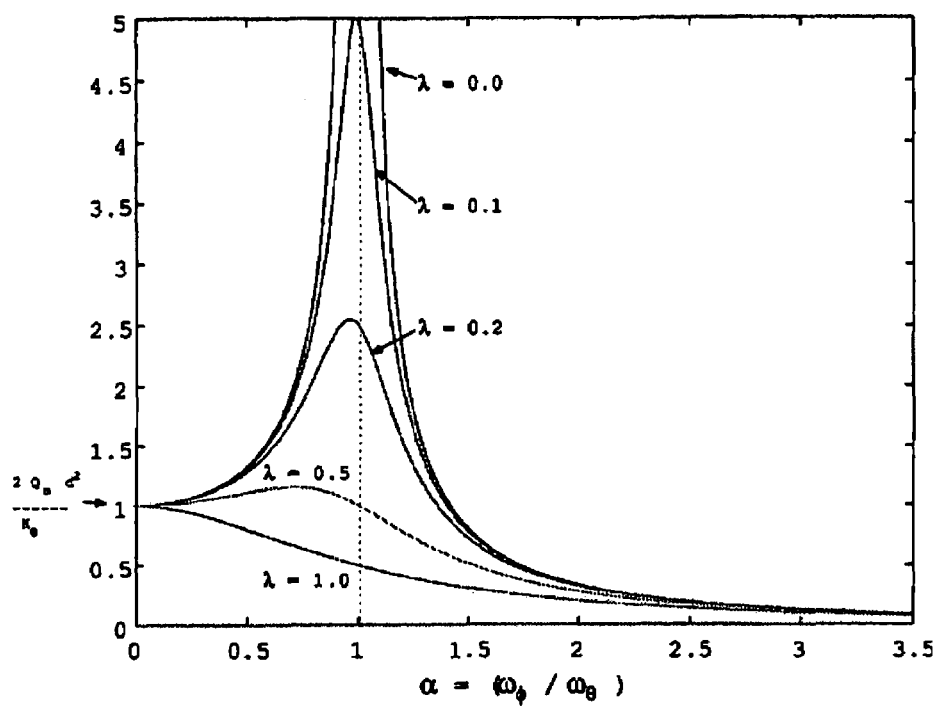
(b)
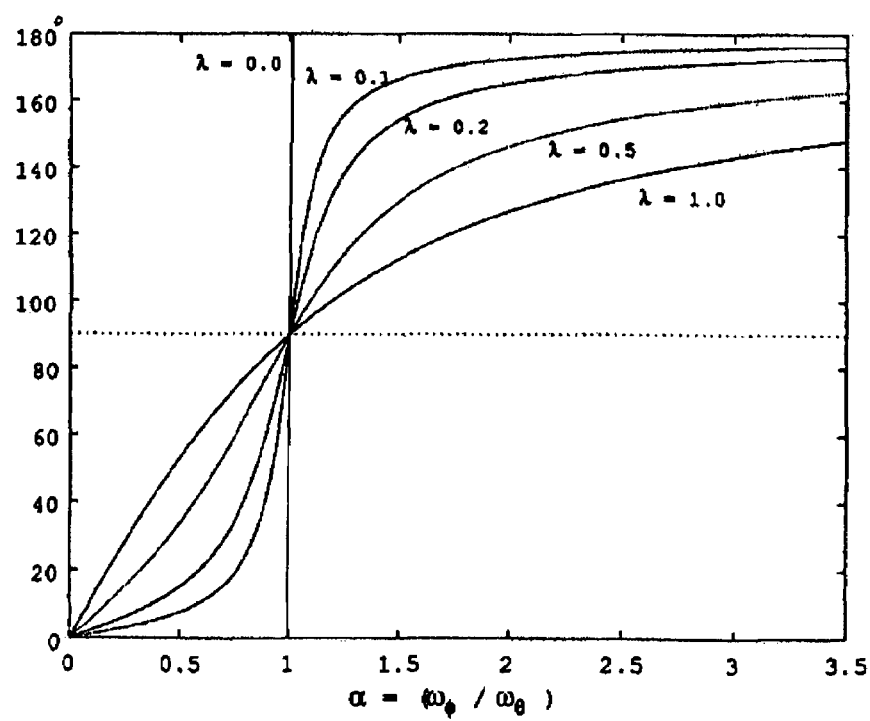

Fig. 12
(a)
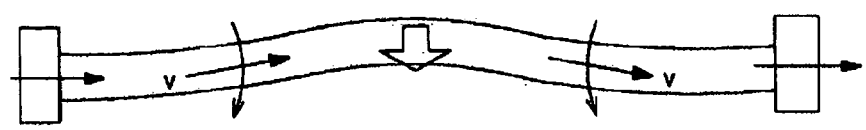
(b)
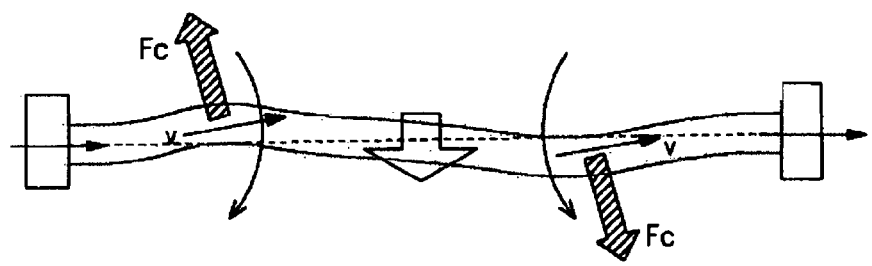

CORIOLIS FLOWMETER

TECHNICAL FIELD

The present invention relates to a Coriolis flowmeter for measuring a mass flow rate of a fluid by detecting a torsional vibration due to a Coriolis force generated in the fluid in a vibrating flow path, in particular, a Coriolis flowmeter capable of performing the measurement of the mass flow rate on an ultra-high-pressure gas, a low density fluid, etc. with enhanced accuracy.

BACKGROUND ART

A Coriolis flowmeter has conventionally been used as a flowmeter for directly measuring the mass flow rate. When a fluid flowing through piping makes a rotational motion, the fluid receives a Coriolis force, which is in proportion to the vector product of the velocity vector of the flow and the angular velocity vector of the rotation. The Coriolis flowmeter measures the mass flow rate of the fluid by detecting, by some method or other, an elastic deformation of the piping generated by this inertial force.

The Coriolis flowmeter is a direct type mass flowmeter, and is of a relatively high accuracy among mass flowmeters. The Coriolis flowmeter is being rapidly improved in terms of accuracy with the recent progress in the digital signal processing technique. Further, the Coriolis flowmeter is capable of performing measurement practically on almost all kinds of fluid including liquid, gas, slurry, and a mixture phase flow of solid, gas, and liquid. Even in the case of a bubbled flow, it allows accurate measurement of mass flow rate if the bubbles are minute and uniform. Further, the feature of the Coriolis flowmeter resides in that the Coriolis flowmeter has no exposed object in its pipeline or no mechanically movable portions, and provides high maintainability. Further, the Coriolis flowmeter is a composite measuring instrument allowing simultaneous measurement of volume flow rate, density viscosity, and temperature, and has such a feature that it is basically free from the influence of the density, viscosity, etc. Thus, the Coriolis flowmeter is expected to be used in a wide range of fields.

FIGS. 7(a)-(b) shows the typical structure and operating principle of a Coriolis type mass flowmeter that has conventionally been put into practical use. Reference numeral 1 indicates a U-shaped tube through which a fluid flows and which has at its center, indicated by reference numeral 2, an excitation electromagnetic coil. The U-shaped tube is caused to make a fine rotational vibration (forced vibration) in a direction ø or in a direction −ø. The fluid flows through the U-shaped tube in the direction as indicated by an arrow v in the figure. Since the respective flow directions in the right-hand and left-hand pipe portions are opposite to each other, the Coriolis force is exerted to twist the U-shaped tube.

When the rotating direction is −ø, a torsional torque is exerted in the opposite direction. When there is no flow, the U-shaped tube makes a parallel vibration, whereas, when there is a flow, a torsional vibration in a direction θ (Coriolis vibration direction) is generated in the U-shaped tube in a magnitude in proportion to the mass flow rate, with the U-shaped tube vibrating in the ±ø directions. The torsion amount is detected as a vibration phase difference at positions 3 and 4 to obtain the mass flow rate.

More specifically, a Coriolis flowmeter as shown, for example, in FIG. 8, is used. In the Coriolis flowmeter shown, the proximal end portions of a U-shaped tube 41 are supported by a wall member 42, with the fluid flowing from an inlet 43 toward an outlet 44. A support plate 46 is fixed to the forward end of the U-shaped tube 41, and a permanent magnet 47 is fixed to the lower surface of the support plate 46 to be directed downwards. The permanent magnet 47 is magnetized in the vertical direction as seen in the figure. On a base 48, there is arranged an electromagnetic coil 49 to face the lower end surface of the permanent magnet 47. By supplying positive and negative electric currents alternately to the electromagnetic coil 49, the forward end portion of the U-shaped tube 41 is vibrated.

Permanent magnets 52 and 53 are respectively fixed to the outer side surfaces of straight pipe portions 50 and 51 on either side of the U-shaped tube 41, and a pick-up 55 formed of a coil is arranged on a support plate 54 fixed to the base 48 to be opposed to the side end surface of the permanent magnet 52. Similarly, a pick-up 57 similar to the pick-up 55 is arranged on a support plate 56 fixed to the base 48.

In the above-described device, when the electromagnetic coil 49 is operated, and a curved pipe portion 45 is moved downwards as stated above, with a fluid flowing through the U-shaped tube 41, a fine rotation is generated in the U-shaped tube 41 due to the operating principle of the Coriolis flowmeter. Since the fluid is flowing through the U-shaped tube in the direction indicated by the arrows, the flow directions in the right-hand and left-hand pipe portions are opposite to each other, and there are generated a downward force as seen in the figure in the straight pipe portion 50 and an upward force as seen in the figure in the straight pipe portion 51 as Coriolis forces. Conversely, when the curved tube portion 45 is moved upwards, an upward force is generated in the straight pipe portion 50, and a downward force is generated in the straight pipe portion 51. Thus, the Coriolis forces are exerted to twist the U-shaped tube.

Due to the above action, the U-shaped tube 41 makes movements as shown, for example, in FIGS. 9(a)-(c). The right-hand and left-hand straight pipe portions, in particular, make movements as shown in the schematic operation diagram of FIG. 10(a). That is, with the fluid flowing through the U-shaped tube 41 as stated above, the forward end of the tube is moved up and down. As shown, for example, in the left-hand column of FIG. 10(a), when the curved tube portion at the forward end of the U-shaped tube moves downwards as indicated by an open arrow, the left-hand straight pipe portion 51 lags behind the right-hand straight pipe portion 50 in its downward movement since a downward force is generated in the right-hand straight pipe portion 50 as seen in the figure, whereas an upward force is generated in the left-hand straight pipe portion 51. Conversely, as shown in the right-hand column of the figure, when the forward end portion of the U-shaped tube moves upwards, the left-hand straight pipe portion 51 lags behind the right-hand straight pipe portion 50 in its upward movement since an upward force is generated in the straight pipe portion 50 on the right-hand side as seen in the figure, whereas a downward force is generated in the straight pipe portion 51 on the left-hand side. From this onward, operations as described above are repeatedly effected.

Since the straight pipe portions make the above-described relative movements as a result of the vibration of the curved tube portion 45 at the forward end of the U-shaped tube 41, the permanent magnets 52 and 53 provided on the straight pipe portions as shown in FIGS. 8 and 9 also make similar movements. As a result, the detection signals from the right-hand and left-hand pick-ups 55 and 57 for detecting the above movements are signals having a phase difference as shown in FIG. 10(b). The higher the mass flow rate of the fluid flowing through the tube, the larger the phase difference time τ, so the mass flow rate is measured by detecting this phase difference time.

In an actual device, the pipe diameter ranges from 1.5 mm to 600 mm, and the flow rate range is 0 kg/h to 680,000 kg/h. In the case of density measurement, the measurement range is 0 kg/m³ to 3,000 kg/m³. The range of temperature at which the actual device is used is from −240° C. to 204° C. The range of pressure under which the actual device is used is from 0.12 MPa to 39.3 MPa, and the weight of the measurement device ranges from 8 kg to 635 kg. As the material of the main portions, there is used stainless steel, hastelloy C, titanium, zirconium or the like. In such a Coriolis flowmeter, the angle by which the U-shaped tube is twisted is 0.01 degrees or less.

In the above-described conventional Coriolis flowmeter using a U-shaped tube, the torsion amount of the U-shaped tube is measured as phase difference time, thereby making it possible to measure mass flow rate with very high accuracy. This is an advantage over the Coriolis flowmeters and the gyroscopic mass flowmeters of the year 1980 or earlier.

An examination of such a Coriolis flowmeter from the viewpoint, in particular, of an improvement in sensitivity, reveals the following fact. That is, using the phase difference time τ, a theoretical equation for calculating mass flow rate $Q_m$ by the above Coriolis flowmeter is expressed as follows:

[Equation 1]

$$Qm = \frac{K_\theta(1 - \omega_\phi^2/\omega_\theta^2)}{2d^2} \cdot \tau \quad (1)$$

where $Q_m$ is the mass flow rate, $K_\theta$ is the spring constant in the twisting direction (direction θ) due to a Coriolis force, $\omega_\theta$ is the natural frequency (Coriolis natural frequency) in the same direction, $\omega_{526}$ is the natural frequency (drive frequency) in the direction of the forced vibration (direction ø), d is the distance between the parallel pipes, and τ is the phase difference time as obtained between the signals from the two pick-ups (which, in this case, are situated at the positions 3 and 4 of FIG. 7(a)). While in a stricter expression, the tangent function of τ is used, an approximate expression is adopted here since the value of τ is very small.

The main conventional Coriolis flowmeters, which perform measurement based on time as stated above, have enjoyed success as flowmeters of very high accuracy. Regarding time resolution, a digital signal processing, etc. utilizing a DSP or the like is also used, and it is to be assumed that, regarding time accuracy, a stage has been reached where no further substantial improvement is to be expected. However, no particularly remarkable improvement has beenmade regarding sensitivity (more precisely, the sensitivity coefficient of the phase difference time with respect to the flow rate).

When considered in terms of an improvement in sensitivity, equation (1) reveals the fact that, if $Q_m$ remains the same, τ increases when the coefficients other than τ are made as small as possible. Re-arranging equation (1) using τ and the frequency ratio α=(drive frequency $\omega_{526}$/Coriolis frequency $\omega_{74}$), the following equation (2) is derived. In FIGS. 11(a)-(b), the horizontal axis indicates the frequency ratio α.

[Equation 2]

$$\tau = \frac{2Q_m d^2}{K_\theta(1 - \omega_\phi^2/\omega_\theta^2)} = \frac{2Q_m d^2}{K_\theta(1 - \alpha^2)}, \quad \left(\alpha = \frac{\omega_\phi}{\omega_\theta}\right) \quad (2)$$

In the graph, $2Q_m d^2/K_\theta$, which is a Y-intercept, is 1. The graph includes a curve indicating the sensitivity when there is viscosity attenuation in the vibration system. Symbol λ indicates the attenuation ratio due to viscosity. In an ordinary Coriolis flowmeter, the damping ratio is very small if not zero.

Thus, in designing a flowmeter of a satisfactory performance, it matters how the value of $2Q_m d^2/K_\theta$ is to be increased and how the value of the frequency ratio α is determined to attain good characteristics.

From the above, for an improved frequency, the following measures may be taken:

(1) To bring the value of α, which is the natural frequency ratio, close to 1 to enhance the sensitivity.

(2) To make the width d as large as possible.

(3) To reduce Kθ, which is a torsion spring constant. (That is, the twisting is made easier to effect).

Regarding Coriolis flowmeters, the following documents are available.

[Patent Document 1] JP 2704768 B
[Patent Document 2] JP 58-117416 A
[Patent Document 3] JP 54-4168 A

DISCLOSURE OF THE INVENTION

Problems to be Solved by the Invention

However, the Coriolis flowmeters as disclosed in the above documents are restricted by various conditions, so they do not allow setting to an extreme degree, which means they only allow setting within a limited range. It is to be assumed that the above design parameters of actual Coriolis flowmeters are limited as follows.

First, regarding the above measure (1), there have been made proposals as disclosed, for example, in Patent Document 1 (JP2704768 B), Patent Document 2 (JP 58-117416 A), and Patent Document 3 (JP 54-4168 A). However, those proposals have the following problems: first, according to those proposals, it is necessary to always control the natural frequency ratio. Second, as shown in FIG. 11(a), the sensitivity fluctuates greatly where α is approximately 1, and even a slight change in α results in a great change in value. Further, the vibration noise from outside is of a frequency most subject to the influence, and a forced vibration is likely to be mixed into the Coriolis vibration. As is apparent from the phase graph of FIG. 11(b), this is a region where an abrupt change in phase is also involved, with the phase being 90 degrees when α=1.

Thus, in that region, only one of the two straight pipe portions vibrates greatly, and the other straight pipe portion does not vibrate. As a result, there arises a problem in that the second vibration signal for detecting the phase difference time may not be output. In view of this, in an actual product, there is adopted a range in which the natural frequency ratio α<1, which corresponds to a region where a certain degree of sensitivity is attained and where the change takes place gently. That is, a pipe configuration is often adopted in which the value of α ranges from approximately 0.2 to 0.6.

Regarding the above measure (2), it is possible to raise the graph as a whole upwards by increasing the value of d. However, in the case of a U-shaped tube of an ordinary configuration, an increase in width makes it difficult to twist the tube. At the same time, the value of $K_\theta$ becomes rather large. Further, an increase in the width d results in an increase in the moment of inertia $I_\theta$ in the Coriolis vibration direction, and thus in a reduction in Coriolis frequency. As stated above, α is restricted to the range of 1 or less, so, when the Coriolis frequency $\omega_\theta$ is reduced, it is necessary to reduce the drive frequency $\omega_\theta$. When the drive frequency becomes too low, the flowmeter becomes vulnerable to frequency noise from the exterior. Further, the response speed is reduced. Thus, it is not desirable to make the drive frequency too low. As a result, the width d is also restricted to a certain degree of dimension.

Regarding the above measure (3), to reduce the torsion spring constant $K_\theta$, it is necessary for the pipe to be as thin as possible and to be of a wall thickness that is as small as possible. In view of this, in existing Coriolis flowmeters, the measurement tube is formed as thin as possible. However, making the measurement tube thinner results in an increase in pressure loss, and the maximum flow rate is substantially restricted. In other words, the pipe inner diameter is determined by the pressure loss permissible for the flow rate to be measured. Further, the minimum flow thickness is determined by the pressure resistance as required in the specifications.

Nowadays, fuel cell powered vehicles are attracting attention, and various types of fuel cell powered vehicles are being developed. As an example of such innovation, the development of a method of mounting an ultra-high-pressure hydrogen fuel tank in a vehicle is under way. For a practical mileage, it is considered necessary to store hydrogen under a pressure of approximately 700 atmospheres in view of the permissible size of the hydrogen fuel tank. Such technique makes it necessary to measure the flow rate of high pressure hydrogen at various places.

It will be possible to use a Coriolis flowmeter for the above purpose. It should be noted, however, for the reason mentioned above, the wall thickness of a Coriolis flowmeter is made as small as possible. Thus, it is difficult to perform measurement on an ultra high pressure fluid with an ordinary Coriolis flowmeter. If the wall thickness is increased in order to increase pressure resistance, the spring constant increases, and the sensitivity is reduced.

Further, a gas is of low density, and exhibits a very large volume if the mass flow rate remains the same. Thus, while measurement can be performed on a gas if the gas is of a medium pressure and a sufficiently large density, when the pressure is, for example, 10 atmospheres or less, the flow velocity becomes too high before the gas is caused to flow until the mass flow rate becomes sufficiently large, which leads to an excessive pressure loss or choking, making it impossible to increase the flow rate. In this way, the pipe must be as thin as possible, and that involves an increase in pressure loss, so it is impossible to cause a gas in a large flow rate to flow through this pipe. Thus, it is impossible to perform measurement on, for example, a gas under normal atmospheric pressure.

An attempt to perform measurement on an ultra high pressure fluid leads to an increase in the wall thickness of the pipe, whereas making the pipe thicker to allow the fluid to flow therethrough at high flow rate results in an increase in spring constant. Thus, a further deterioration in sensitivity is inevitable in the measurement of the flow rate of a gas, which is a substance of low density and involves shortage of sensitivity.

As stated above, in the conventional Coriolis flowmeter based on phase difference time measurement, the vibration is effected at a frequency ratio of approximately 0.4 in order to enhance the sensitivity of the Coriolis flowmeter. However, at such a frequency ratio, the flowmeter is subject to the influence of extraneous vibration when it is driven at a frequency of approximately 80 Hz to 200 Hz.

It is accordingly a principal object of the present invention to provide a Coriolis flowmeter which is little subject to the influence of vibration noise from outside, which is of high sensitivity even when the pressure resistance is increased to make it possible to measure the flow rate of an ultra high pressure fluid, such as the hydrogen in the ultra high pressure hydrogen tank of a fuel cell powered vehicle, which is of high sensitivity even when the pipe is made thicker so that measurement can be performed on a low density fluid such as a fluid under normal atmospheric pressure, which is of high sensitivity even when formed in a small size, which is little subject to the influence of noise, viscosity, etc., and which can be manufactured at low cost.

Means for Solving the Problems

In the following, it will be described how the characteristics of a Coriolis flowmeter were examined in order to solve the above problems in conventional Coriolis flowmeters, thus making the present invention. First of all, the present invention is characterized in that it utilizes an amplitude ratio measurement method. The amplitude ratio measurement method is a method in which, instead of measuring phase difference time, the amplitude of a vibration is measured in a Coriolis flowmeter by some method or other to detect mass flow rate. The method has been known since the time when the Coriolis flowmeter was developed. For example, according to JP 60-34683 B, JP 08-20295 B, JP 02-501006 A, etc., the amplitude of a Coriolis vibration and the amplitude of a forced vibration are detected by some method or other to calculate mass flow rate by, for example, by obtaining the ratio of those amplitudes.

The measurement principle is as follows. When the coordinate system of FIG. 7(a) is used, an equation of motion with respect to a Coriolis torsional vibration direction can be obtained as follows:

[Equation 3]

$$\delta F_c = 2\delta m \upsilon \dot\phi \qquad (3)$$

Assuming that the flow velocity is v, and that the mass of the fluid per minute length is $\delta_m$, the Coriolis force Fc is exerted in a direction perpendicular to the flow as described above with reference to FIGS. 7(a)-(b).

The direction in which the Coriolis force is exerted differs between the portion where the fluid heads for the exterior and the portion where it returns inwards, so the U-shaped tube is twisted in the direction θ as shown in FIGS. 7(a)-(b). The torsion is caused by the torque due to the Coriolis force, which is in proportion to the product of mass and flow velocity as shown in equation (3). By measuring this torsion by some method or other, it is possible to obtain mass flow rate.

Suppose the density of the fluid is ρ, and that the sectional area of the tube is A. When considered in terms of the coordinate system of FIGS. 7(a)-(b), the torque T generated in the both pipe portions in the direction θ can be expressed as follows:

[Equation 4]

$$T = 2 \times \frac{d}{2}\int_0^L \delta F_c = d\int_0^L 2\delta m v\dot{\phi} = 2d\rho A L v\dot{\phi} \quad (4)$$

In an ordinary Coriolis flowmeter, the U-shaped tube is vibrated in tune with the natural angular frequency $\omega\phi$ in the direction $\phi$. Assuming that the maximum vibration angle in the direction $\phi$ is $\Phi_0$, the angle and the angular velocity when the vibration in the direction $\phi$ is effected in sinusoidal waves can be expressed as follows:

[Equation 5]

$$\dot{\phi} = \omega_\phi \Phi_0 \cos \omega_\phi t \quad (5)$$

[Equation 6]

$$\dot{\phi} = \omega_\phi \Phi_0 \cos \omega_\phi t \quad (6)$$

Assuming that the moment of inertia of the U-shaped tube (including the fluid inside) with respect to $\theta$ is $I_\theta$, and that the spring constant is $K_\theta$, an equation of motion for torsional angle can be derived from equations (4) and (6).

[Equation 7]

$$I_\theta \frac{d^2\theta}{dt^2} + K_\theta \theta = T = 2d\rho A L v \omega_\phi \Phi_0 \cos \omega_\phi t \quad (7)$$

After a sufficient length of time has elapsed, it is to be assumed that the transient response in the direction $\phi$ is attenuated to fade away. When simplification is made such that the attenuation is not so great as to involve a phase difference in the steady-state response, it is to be assumed that, of the torsional vibration in the direction $\phi$, only the steady-state response in tune with the forced vibration remains. When the following equation is adopted in equation (7) as a particular solution, arrangement is possible with respect to the coefficients.

[Equation 8]

$$\theta = \Theta_0 \cos \omega_\phi t \quad (8)$$

Here, the mass flow rate $Q_m$ can be set to $\rho A v$, so through arrangement of the coefficients of both sides of equation (7), into which equation (8) is substituted, with respect to the mass flow rate, the following equation can be derived:

[Equation 9]

$$Q_m = \rho A v = \frac{(K_\theta - I_\theta \omega_\phi^2)\Theta_0}{2dL\omega_\phi \Phi_0} \quad (9)$$

In this way, in a Coriolis mass flowmeter, if each amount on the right-hand side can be ascertained, it is possible to directly measure the mass flow rate.

Further, the manner of vibration will be considered. Here, equation (8) is used as a particular solution. That is, the torsional angle $\theta$ is in tune with the rotating speed in the direction $\phi$. Thus, when the rotating speed is minimum, the torsion is zero, which means that, at this time, the U-shaped tube is horizontal. At this time, the U-shaped tube is bent to the maximum degree in the direction $\phi$. Conversely, this indicates that the maximum torsional angle is attained when the rotation speed is maximum, that is, when the U-shaped tube passes the neutral position ($\phi=0$). This can be depicted as in FIG. 10(a).

To obtain information on the magnitude of the maximum torsional angle, equation (9) will be arranged with respect to the maximum torsional angle $\Theta_0$ as follows:

[Equation 10]

$$\Theta_0 = \frac{2dQ_m L \omega_\phi \Phi_0}{(K_\theta - I_\theta \omega_\phi^2)} \quad (10)$$

This indicates that when $\omega_\phi$ satisfies the condition: $K_\theta = I_\theta \omega_\phi^2$, resonance with the torsional vibration (the vibration in the direction $\theta$) occurs, resulting in divergence of the torsional angle $\Theta_0$. The natural frequency in the torsional direction is referred to, for example, as Coriolis frequency, and the angular frequency at this time can be defined as follows:

[Equation 11]

$$\omega_\theta = \sqrt{\frac{K_\theta}{I_\theta}} \quad (11)$$

When the density of the fluid is determined, the Coriolis frequency is determined. By substituting it into equation (9) instead of the moment of inertia $I_\theta$, it is possible to derive the following equation from equation (9):

[Equation 12]

$$Q_m = \frac{K_\theta(1 - \omega_\phi^2/\omega_\theta^2)\Theta_0}{2dL\omega_\phi \Phi_0} \quad (12)$$

Equation (12) indicates that it is necessary to perform measurement of the maximum angle $\Phi_0$ in the direction $\phi$ of the U-shaped tube and the maximum angle $\Theta_0$ in the direction $\theta$ (torsion) thereof. In reality, however, they are very small angles.

In the phase difference time measurement method, time is adopted as the physical amount to be measured based on the following concept. It is possible to utilize the fact that the U-shaped tube passes the neutral position thereof at the maximum torsional angle. Roughly speaking, assuming that the vibrations of the right-hand and left-hand pipe portions of the U-shaped tube are detected at positions corresponding to the length L, the velocity at the neutral position of those points is obtained as $L\omega_\phi \Phi_0$, and the difference in position between the two pipe portions is obtained as $\Theta_0 d$. The passage time difference $\tau$ of the neutral plane can be considered as $\Theta_0 d/L\omega_{526} \Phi_0$. By rewriting equation (12) using this, the following equation is finally obtained:

[Equation 13]

$$Q_m = \frac{K_\theta(1 - \omega_\phi^2/\omega_\theta^2)}{2d^2} \cdot \frac{\Theta_0 d}{L\omega_\phi \Phi_0} = \frac{K_\theta(1 - \omega_\phi^2/\omega_\theta^2)}{2d^2} \cdot \tau \quad (13)$$

By utilizing this equation, it is possible to ascertain the mass flow rate through measurement of the time difference $\tau$ between the times at which the vibration detecting points pass the neutral plane. However, the coefficients other than $\tau$ include ones varying with temperature like the spring constant, so correction according to temperature is necessary.

In the amplitude ratio measurement method, amounts related to $\Theta_0$ and $\Phi_0$ prior to conversion to $\tau$ are measured individually, and calculation is effected through division.

According to the present invention, a Coriolis flowmeter with novel features is obtained by utilizing the above amplitude ratio measurement method. The present invention utilizes the fact that, in vibration measurement, the higher the frequency, the higher the sensitivity in the measurement of velocity amplitude than in the measurement of displacement amplitude, and the higher the sensitivity in the measurement of acceleration amplitude than in the measurement of velocity amplitude. This characteristic is due to the following relationship between displacement, velocity, and acceleration as shown in the following equation.

That is, when the vibration is effected with the displacement $\theta = \Theta_0 \cos(\omega_{526} t)$, the vibration velocity is obtained by performing differentiation once, and the vibration acceleration is obtained by performing differentiation twice. Thus, the following equation is derived:

[Equation 14]

$$\theta = \Theta_0 \cos(\omega_\phi t), \quad v = \omega_\phi \Theta_0 \cdot \sin(\omega_\phi t), \quad a = -\omega_\phi^2 \Theta_0 \cdot \cos(\omega_\phi t) \quad (14)$$

Thus, the amplitudes $V_{\theta 0}$ and $A_{\theta 0}$ are obtained as follows:

[Equation 15]

$$V_{\theta 0} = \omega_\phi \Theta_0, \quad A_{\theta 0} = \omega_\phi V_{\theta 0} = \omega_\phi^2 \Theta_0 \quad (15)$$

It can be seen that by multiplying the denominator and numerator of the amplitude term of equation (13) by $\omega_{526}$, it is possible to perform mass flow rate measurement through velocity measurement, and that by multiplying the denominator and numerator of the amplitude term of equation (13) by $\omega^2_\theta$, it is possible to perform mass flow rate measurement through acceleration measurement.

[Equation 16]

$$Q_m = \frac{K_\theta(1 - \omega_\phi^2 / \omega_\theta^2)}{2d^2} \cdot \frac{\Theta_0 d \omega_\phi}{L \omega_\phi^2 \Phi_0} \quad (16)$$

$$= \frac{K_\theta(1 - \omega_\phi^2 / \omega_\theta^2)}{2d^2} \cdot \frac{V_{\theta 0} d}{L V_{\phi 0} \omega_\phi}$$

[Equation 17]

$$Q_m = \frac{K_\theta(1 - \omega_\phi^2 / \omega_\theta^2)}{2d^2} \cdot \frac{\Theta_0 d \omega_\phi^2}{L \omega_\phi^2 \Phi_0 \cdot \omega_\phi} \quad (17)$$

$$= \frac{K_\theta(1 - \omega_\phi^2 / \omega_\theta^2)}{2d^2} \cdot \frac{A_{\theta 0} d}{L A_{\phi 0} \cdot \omega_\phi}$$

Through this modification, it can be seen that mass flow rate measurement is possible through measurement and computation of the vibration velocity $V_{\theta 0}$ of the Coriolis vibration, the rotation acceleration $A_{\theta 0} d = \omega^2_\theta d$, the rotation acceleration $A_{\phi 0} L = \omega^2_\phi \Phi_0 L$ of the forced vibration, and the frequency $\omega_\theta$ of the forced vibration. Here, as in the case of the phase difference time $\tau$, modification to notation in terms of sensitivity coefficient is effected, with the horizontal axis indicating the frequency ratio $\alpha$, and the vertical axis indicating the amplitudes. For positive expression of the frequency ratio $\alpha$, the following substitution is effected:

[Equation 18]

$$\omega_\phi = \alpha \sqrt{K_\theta / I_\theta} \quad (18)$$

[Equation 19]

$$\Theta_0 = \frac{2Q_m dL \omega_\phi \Phi_0}{K_\theta(1 - \alpha^2)} = \frac{2Q_m dL \Phi_0}{K_\theta} \cdot \omega_\theta \cdot \frac{\alpha}{(1 - \alpha^2)} \quad (19)$$

$$= 2Q_m dL \Phi_0 \cdot \frac{1}{\sqrt{K_\theta I_\theta}} \cdot \frac{\alpha}{(1 - \alpha^2)}$$

Similarly, through arrangement in terms of velocity and acceleration, the following equations can be derived from equation (15):

[Equation 20]

$$V_{\theta 0} = \omega_\phi \Theta_0 = 2Q_m dL \Phi_0 \cdot \frac{1}{I_\theta} \cdot \frac{\alpha^2}{(1 - \alpha^2)} \quad (20)$$

[Equation 21]

$$A_{\theta 0} = \omega_\phi^2 \Theta_0 = 2Q_m dL \Phi_0 \cdot \frac{\sqrt{K_\theta}}{I_\theta \sqrt{I_\theta}} \cdot \frac{\alpha^3}{(1 - \alpha^2)} \quad (21)$$

FIG. 1 is a graph showing changes in the terms of the equations related to $\alpha$. Each sensitivity is obtained by multiplying this function by the foregoing term. As can be seen from this also, unlike in the above measurement of phase difference time, the sensitivity increases in the region where the frequency ratio is 1 or more. In the case in which an acceleration sensor is used, the sensitivity further increases by increasing the frequency ratio. As is apparent from the figure, near the region where the frequency ratio is 1, there exists a portion where the influence of the change in frequency ratio on the sensitivity is too large, so, although it depends on the condition of use, there is selected a frequency ratio of 1.3 or more, and more preferably, 1.5 or more.

In the conventional techniques using the amplitude ratio measurement method as disclosed in JP 60-34683 B, JP 08-20295 B, and JP 02-501006 A, it can be seen that the use of the flowmeter in a region where the frequency ratio is larger than 1 is a prerequisite However, most of those techniques employ a velocity sensor for measurement, and only utilize the fact that the value of $\alpha$ of approximately 2 to 3 is relatively large as compared with the case in which it is 1 or less. Further, while some of those publications include a statement to the effect that the detection means can be replaced by an acceleration sensor, they are, unlike the present invention, not based on the concept that the sensitivity further increases when measurement is performed by an acceleration sensor and that a region where the frequency ratio is of a large value, such as 2 or more, is to be positively utilized.

In particular, in the present invention, in order to positively utilize a region where the frequency ratio is 1 or more, such a structure is adopted that a reinforcing frame is provided in the Coriolis vibration direction. This is due to the fact that, when the pipe itself, which is a continuous member, is vibrated in a region where the natural frequency is 1 or more, a higher-order vibration mode is intensified, and that it is rather difficult to effect a proper excitation or obtain such a vibration as will testify the above theory.

Further, a Coriolis flowmeter according to the present invention is designed with a focus on the following fact, thereby providing features superior to those of conventional Coriolis flowmeters. That is, attention is focused on the most right-hand side of equation (21), and the guidelines for the design of the Coriolis flowmeter are considered from the viewpoint of enhancing sensitivity, thereby making the following fact clear. In this equation, the amplitude $\Phi_0$ of the forced vibration is given as positive in the numerator. Thus, it can be seen that the larger the amplitude of the forced vibration, the better. In this regard, in the conventional phase difference time measurement method, the amplitude of the forced vibration does not affect the sensitivity. When the density of the fluid is high, and the sensitivity is not required to be so high, it is easier to improve the measurement accuracy when there is no influence of the amplitude of the forced vibration, which means the phase difference time measurement method is more advantageous. Conversely, if the amplitude of the forced vibration is increased to increase the angular frequency and the Coriolis force, the sensitivity cannot be improved. This is due to the fact that if the Coriolis force is increased and the vibration is intensified, the passage velocity of the forced vibration becomes so much larger, and the effect is canceled and is not observed in the phase difference time measurement method. From this point of view, the above method is disadvantageous when attention is focused on enhancement of sensitivity.

Of special note is the fact that the spring constant $K\theta$ in the Coriolis vibrating direction, which is in the denominator in the phase difference time measurement method, is in the numerator in the amplitude ratio measurement method. Thus, conversely to the phase difference time measurement method, an increase in the spring constant and an increase in the Coriolis frequency contribute to an improvement in sensitivity. That is, with an optimized design based on the measurement method of the present invention, it is possible to simultaneously realize an improvement in sensitivity, an improvement in pressure resistance, and an increase in the pipe diameter. It is possible to reduce the flow velocity of the fluid with respect to the mass flow rate, so even a gas, in particular, can be caused to flow in a large amount. In particular, in a hydrogen filling device for a fuel cell powered vehicle, it is a serious technical issue as to how to effect filling under a pressure of 700 atmospheres. Thus, a flowmeter capable of properly measuring the mass flow rate of a gas under such a high pressure is very useful, which means the features of the Coriolis flowmeter of the present invention are particularly advantageous.

Further, the denominator has the 3/2-th power of the moment of inertia $I_\theta$. This indicates that it is advantageous to make the moment of inertia around $\theta$ as small as possible to achieve compactness. In conventional Coriolis flowmeters, a certain degree of width is secured in order to achieve an improvement in sensitivity due to an increase in d and to achieve a reduction in torsion spring constant. Thus, when the pipe diameter increases, the size of the main body of the Coriolis flowmeter becomes excessively large, which is a disadvantage of the conventional Coriolis flowmeters. In contrast, the Coriolis flowmeter of the present invention is compact for the reason mentioned above. While it has a problem in that when the density of the fluid changes the moment of inertia changes to cause a change in sensitivity, this is not much of a problem when the density changes only to a degree that the measurement is not affected. Even when the measurement is affected, it is possible to contrive a piping design such that the moment of inertia $I_\phi$ in the direction of the forced vibration changes in such an amount as will cancel the change in the moment of inertia $I_\theta$ in the Coriolis direction so that the natural frequency ratio $\alpha$ may not be changed. A similar technique is disclosed in JP 02-504671 A. Further, a change in $\omega_{526}$, which is the natural frequency of the forced vibration, reflects a change in the moment of inertia $I_{526}$. By measuring this, it is possible to indirectly ascertain the moment of inertia $I_\theta$, which undergoes a change at the same time. Thus, by measuring $\omega_\phi$, it is also possible to compute the correction coefficient of the requisite calibration coefficient from a previously stored correction coefficient equation or a correction coefficient table to effect correction.

Further, in the present invention, the higher the Coriolis frequency, the better, and it is desirable for the drive frequency for measurement to be still higher. Unlike in the phase difference time measurement method described above, this has an effect of increasing the measurement frequency. This indicates that measurement can be performed at a frequency much higher than the drive frequency conventionally adopted, which ranges from approximately 60 Hz to 200 Hz. It is said that the noise vibration transmitted from the piping is approximately 200 Hz at the most, and by performing measurement at a frequency higher than that, it is possible to reduce the influence of external noises. Further, in the present invention, it is possible to remove noise vibration through the use of an appropriate filter to perform amplitude measurement. By using a phase demodulator, it is possible to extract exclusively the effective amplitude of that frequency, so a further improvement is achieved in terms of noise resistance. This can be effected with high accuracy not only by an analog circuit but also through digital signal processing.

According to the Coriolis flowmeter technique as disclosed in JP 2575203 B, etc., correction is effected by the influence of viscosity, whereas, according to the present invention, driving is performed at a frequency much higher than the Coriolis frequency, so, as can be seen from the phase chart of FIG. 11(b), even if there is involved some viscosity or it undergoes a change, the phase substantially approximates to 180 degrees, and no great change is involved. Thus, even when the viscosity undergoes a change, it does not easily affect the sensitivity. Accordingly, there is less need for the correction as effected in the technique as disclosed in the above patent publication.

Further, the Coriolis flowmeter of the present invention has a frame extending in the Coriolis vibration direction for approximation to a one-axis vibration, so the vibrating deformed portion is concentrated on the elastically deformable portion intentionally designed to be easily deformable. Thus, the spring portion affecting the spring constant in the Coriolis vibration direction is not mainly the piping but this elastically deformable portion. This spring constant is under the influence of temperature, so it is usually corrected through measurement of the temperature of the piping. Thus, correction is performed by using the temperature of this elastically deformable portion. The Coriolis flowmeter of the present invention, however, unlike the piping, is not directly subject to the influence of the liquid temperature. This is due to the fact that the elastically deformable portion is spaced apart from the piping and is not easily and directly affected by the liquid temperature, and that, if affected, the resultant change is gentle.

When an acceleration sensor is used in the Coriolis flowmeter of the present invention, it is possible to form the flowmeter with a single measurement pipe. However, it is also possible to adopt two pipes symmetrically arranged. In this structure, there are two pipes through which the fluid to be measured flows, with the fluid flowing in the same direction through the two pipes parallel to each other. There are provided, in a plane symmetry, a frame for the piping, forced vibration means, and means for suppressing higher-order vibration, and means for obtaining the vibration amplitude or the like, with the forced vibration being effected in opposite directions as in the case of a tuning fork. With this design, an improvement is achieved in terms of the vibrating condition, and it is possible to reduce the influence of extraneous vibration, and to suppress transmission of the forced vibration to the exterior.

Further, when, in the Coriolis flowmeter of the present invention, two symmetrical pipes are adopted, the following features can be realized. First, a case will be considered where the two symmetrical pipes are arranged in series. That is, the fluid flowing in from outside is allowed to flow in through the inlet port of one pipe, without being divided. After it has passed through one pipe and flowed out, the fluid is connected to the inlet port of the other pipe. After it has passed through the other pipe, the fluid flows out of the flowmeter. In this way, the flow passages are connected in series. As stated above, vibrations opposite to each other are effected with two pipes. However, due to the use of an acceleration sensor, the calculation of the flow rate is also possible with a single pipe. Thus, in the calibration of the flowmeter, it is possible to determine a calibration coefficient for each one of the pipes. Here, the pipes will be referred to as pipe 1 and pipe 2. When the pipes 1 and 2 are connected in series, the calibration can be effected simultaneously on them on the condition that they have the same flow rate. This means that simultaneous calibration is effected with two flowmeters arranged in series. Further, at the time of measurement, the same flow rate is measured by two flowmeters, and through output of the average of the measurement values of the two as the flow rate measurement value, it is possible to achieve an improvement in terms of stability and accuracy. When there is a great difference between the measurement values of the two pipes, application to failure diagnosis is possible based on this difference. Further, temperature correction on the elastically deformable portion, e.g., temperature correction on the spring constant, can be effected on each pipe, so fine correction is possible for each pipe, thereby achieving an improvement in terms of accuracy. However, this involves an increase in pressure loss, and the maximum flow rate is relatively limited.

There exists a Coriolis flowmeter on the market, in which two symmetrical pipes are similarly arranged in series. In this existing Coriolis flowmeter, however, magnets and coils are separately mounted to the two pipes for measurement of relative velocity of the two pipes. Thus, the fact remains that the two pipes constitute one flowmeter, which means only one flow rate value can be output. Accordingly, a diagnosis function based on comparison of two outputs, an improvement in accuracy by obtaining an average value, an individual correction of the spring constant, etc. through temperature measurement, etc. are not realized.

Next, a Coriolis flowmeter will be considered which is equipped with a branch-off pipe dividing a fluid substantially equally. In this Coriolis flowmeter, the fluid separately flows into two pipes, and having passed through the pipes, the fluid flows join together at a joining pipe, flowing out of the flowmeter as a joint flow. In this way, this Coriolis flowmeter is equipped with branch-off and joining pipes, with the flow paths being arranged in parallel. This makes it possible to double the sectional area of the flow path, so, as compared with the series type or a single-pipe type, the pressure loss can be reduced if the pipe diameter remains the same. The maximum flow rate is also increased. This corresponds to a state in which flowmeters are arranged in parallel, and the sum total of the flow rate signals from the pipes 1 and 2 constitutes the measured flow rate value.

Many Coriolis flowmeters on the market adopt the structure in which two pipes are arranged in parallel. However, it does not necessarily mean that the fluid flows at the same flow rate in the pipes 1 and 2. Even if some contrivance is made at the flow dividing portion, when a strong swirling flow or a whirl flow comes from the upstream side, there is a fear in that the flow division ratios differ. Two pipes constitute one flowmeter, so it is impossible to discern any difference in the flow division ratios. In contrast, in the parallel type Coriolis flowmeter of the present invention, each flowmeter can calculate the flow rate value, so accurate measurement is possible even if there is a change in the flow division ratios.

However, a problem occurs at the time of calibration of the flowmeter, when a calibration coefficient is determined for each of the two parallel pipes. While it is possible to determine the calibration coefficient on the assumption that the fluid is flowing equally under a condition where equal flows are realized through proper arrangement of the upstream conditions, it is also possible to check and determine the calibration coefficient of each of them by the following method.

Assuming that the flow rates of the fluid flowing through the pipes 1 and 2 are $Q_1$ and $Q_2$, respectively, the relationship between the flow rates, the flow rate output values obtained through amplitude measurement, and the calibration coefficients can be simply expressed as follows:

$$Q_1 = A_1 \times (X_1 - B_1)$$

$$Q_2 = A_2 \times (X_2 - B_2)$$

where Q is the flow rate, A is the span calibration coefficient, X is the output value, and B is the output value when the flow rate is zero, with the numerical subscripts indicating the pipes 1 and 2, respectively. When the flow is divided by the pipes 1 and 2, the total flow rate Q is obtained through addition of the calculation values of the two pipes as follows:

$$Q = Q_1 + Q_2$$

Assuming that the flow rate Q at the α-th calibration is $Q_\alpha$, the calibration result is expressed as follows:

$$Q_\alpha = A_1 \times (X_{1\alpha} - B_1) + A_2 \times (X_{2\alpha} - B_2)$$

Similarly, the flow rate $Q_\beta$ at the time of the β-th calibration is expressed as follows:

$$Q_\beta = A_1 \times (X_{1\beta} - B_1) + A_2 \times (X_{2\beta} - B_2)$$

When the valve is closed to reduce the flow rate to zero, it is to be assumed that both $Q_1$ and $Q_2$ are zero. Assuming that the output value at this time is $X_z$, $$B_1 = X_{1z}$$

$$B_2 = X_{2z}$$

Thus, $$Q_\alpha = A_1 \times (X_{1\alpha} - X_{1z}) + A_2 \times (X_{2\alpha} - X_{2z})$$

$$Q_\beta = A_1 \times (X_{1\beta} - X_{1z}) + A_2 \times (X_{2\beta} - X_{2z})$$

Thus, two equations are obtained whose unknown coefficients are $A_1$ and $A_2$. By solving those simultaneous equations, it is possible to calculate the respective calibration coefficients. In this method, when the kinds of flow rate are augmented, it is also possible to determine a coefficient that is most appropriate for each flow rate. When it is possible to provide a calibration coefficient for each pipe, it is possible to effect correction on each pipe when there is a difference in temperature between the pipes, so it is possible to effect more accurate correction with respect to temperature changes, etc. Further, through comparison of the values of the two parallel pipes, it is possible to diagnose any abnormality in flow division due to swirling flow or flow disturbance on the upstream side.

As described above, a Coriolis flowmeter designed to be optimized based on the measurement method of the present invention can be provided with advantageous features that are totally different from the features as obtained by the conventional time phase difference measurement method.

When all the acceleration sensors are replaced by velocity sensors, it is not possible to achieve an improvement in terms of sensitivity through an increase in the natural frequency ratio. However, that makes it possible to avoid a change in sensitivity due to a change in the natural frequency ratio. Further, when the natural frequency ratio is high, filtering or detection demodulation is effected where the noise vibration mixed into the Coriolis vibration is small, whereby an improvement is achieved in terms of an SN ratio. When the velocity sensor is used, the spring constant in the twisting direction does not affect the sensitivity as shown on the right-hand side of equation (20).

In the conventional phase difference time measurement method, this spring constant directly affects the sensitivity, so sensitivity correction due to temperature change is effected through pipe temperature measurement. Further, when the pressure differs as compared with the calibrated condition, conventional Coriolis flowmeters are easily affected by the influence of a change in second moment of sectional area due to pipe expansion, that is, a change in the spring constant. In this regard, when a velocity sensor is used, this influence is eliminated, and an improvement in terms of performance is achieved from the viewpoint of stability for a long period of time. Thus, it can be seen that when the density of the object fluid concerned is high, and sensitivity is secured to a certain degree, it is possible to obtain a special effect that cannot be obtained even by the conventional Coriolis flowmeter using a velocity sensor.

It is to be assumed that also in the technique as disclosed in JP 02-501006 A, measurement is performed where the natural frequency ratio is 1 or more to obtain a similar effect. The above publication, however, does not suggest that a further improvement in SN ratio is to be expected when the natural frequency ratio is further increased to several to 10 times or the like the original natural frequency ratio. When such a large natural frequency ratio is applied, it is impossible to avoid a complicated vibration with nodes of a higher-order mode unless there is provided a reinforcing frame in the Coriolis vibration direction as in the present invention. In this respect, it will be safe to say that the idea of adopting a natural frequency ratio of several times or more as high as the original by using a reinforcing frame has not been conceived yet.

An experiment for examining the characteristics of a sensor tube was conducted on a trial model prepared on the basic principle of the present invention as described above. The trial model has a forced vibration frame at its center, and supports the piping constituting the Coriolis vibration frame by a self-aligning ball bearing. Further, a flexible tube is used for the connection to the Coriolis frame, so that twisting in the Coriolis vibration direction is very likely to occur. It is possible to install arbitrary springs individually with respect to the Coriolis vibration direction and the forced vibration direction, making it possible to perform an experiment at an arbitrary natural frequency ratio. However, since optimization based on the above theory has not been effected, the moment of inertia with respect to the Coriolis vibration direction is very large. Although the sensitivity is not sufficiently high due to the low Coriolis frequency, etc., the features of the present invention are to be observed.

FIG. 6(a) shows measurement results obtained by conducting measurement with the spring constant and the moment of inertia set such that the Coriolis natural frequency is 15 Hz, and with the forced vibration frequency varied from 5Hz to 55Hz, and by dividing the difference between the outputs from the two velocity sensors by a value corresponding to the amplitude $\Phi_0 L$ of a forced vibration measured by a laser vibration meter. Regarding the flow rate, it was obtained by subtracting the measurement result as obtained through measurement at 0 kg/h from the measurement result as obtained through measurement at a fixed value of 200 kg/h. To display solely the component with respect to the phase angle at which a Coriolis vibration ought to occur, correction is effected based on the phase angle with respect to the forced vibration signal. The amplitude $\Phi_0 L$ of the forced vibration is maintained at a fixed level by a control circuit. Here, a theoretical sensitivity curve is depicted based on equation (22) by means of text calculating, and size fitting is effected thereon. Thus, it does not indicate any coincidence with respect to absolute values. However, it is to be assumed that a perfect matching is achieved with respect to the curve configuration. Regarding the portion out of the theoretical curve, which is at a frequency ratio of 3, it seems to have appeared due to some resonance vibration of the frame since the strength of the Coriolis vibration frame is insufficient and optimum design has not been conducted.

[Equation 22]

$$y = \frac{\alpha^2}{(1-\alpha^2)} \qquad (22)$$

FIG. 6(b) shows the result as obtained by dividing the difference between the outputs from the acceleration sensors as obtained under the same condition as described above by a value corresponding to the amplitude $\Phi_0 L$ of a forced vibration measured by a laser vibration meter, displaying only the component with respect to the phase angle at which a Coriolis vibration ought to occur.

In the figure, a theoretical sensitivity curve is depicted based on equation (23) by using a spreadsheet, and size fitting is effected thereon. Thus, it does not indicate any coincidence with respect to absolute values. However, it is to be assumed that a perfect matching is achieved with respect to the curve configuration.

[Equation 23]

$$y = \frac{\alpha^3}{(1-\alpha^2)} \qquad (23)$$

FIG. 6(c) shows the result obtained through sensitivity measurement under a condition in which a variation is effected to increase the moment of inertia $I_\theta$ through addition of a ballast while varying the drive frequency, and in which the natural frequency ratio α is fixed to 2.7. Thus, it can be seen that by removing the ballast and increasing the Coriolis natural frequency, the sensitivity is improved in proportion to the third power of the Coriolis natural frequency. The Coriolis natural frequency is related to the moment of inertia $I_\theta$ as shown in equation (18), and, in acceleration measurement, it is related to the moment of inertia $I_\theta$ as shown in equation (21). Thus, when the Coriolis natural frequency is varied while varying solely the moment of inertia, the sensitivity is in inverse proportion to the third power of the square root of the moment of inertia when the natural frequency ratio α is fixed. Thus, the theoretical characteristics as expressed in equation (20) have been proved experimentally.

FIG. 6(d) shows the result of a sensitivity measurement conducted under a condition in which the spring constant is varied to vary the Coriolis natural frequency while varying the drive frequency and in which the natural frequency ratio α is fixed 2.7. It can be seen that the sensitivity increases in proportion to the Coriolis natural frequency. As can be seen from equations (18) and (20), the sensitivity increases in proportion to the square root of the spring constant in the Coriolis direction. This also experimentally proves the theoretical characteristics as expressed by equation (20).

The principal structure of a Coriolis flowmeter according to the present invention as obtained based on the foregoing description is as follows. That is, according to an aspect of the present invention, there is provided a Coriolis flowmeter including: a forced vibration means for vibrating from outside a pipeline through which a fluid to be tested flows and generating a fine rotational vibration in the fluid to generate a Coriolis force in the fluid; means for suppressing a higher-order vibration by limiting a Coriolis vibration which vibrates with a vibration axis different from the vibration axis of the forced vibration and which is induced by the Coriolis force to a vibration close to a one-axis vibration with respect to the vibration direction of the Coriolis vibration through a combination of a rigid frame which is not easily deformed and an elastically deformable portion which is subject to deformation; a forced vibration control means for effecting driving at a drive frequency that makes the frequency of the forced vibration of the pipeline caused by the forced vibration means be one time or more as high as a Coriolis natural frequency that is a natural frequency in the direction of the Coriolis vibration; means for obtaining the vibration amplitude of the forced vibration generated by the forced vibration means; means for obtaining the vibration amplitude of the Coriolis vibration generated by the Coriolis force generated by the forced vibration; and a mass flow rate computing means for computing the flow rate of the fluid flowing through the pipeline from the ratio of the amplitude of the forced vibration caused in the pipeline by the forced vibration means and the amplitude of the Coriolis vibration generated by the Coriolis force and the value of the frequency of the forced vibration.

Further, according to another aspect of the present invention, in the above-described Coriolis flowmeter, the Coriolis flowmeter further includes two vibration amplitude detecting means for detecting the amplitude of a vibration of the pipeline generated by Coriolis forces in directions opposite to each other generated by the forced vibration, the means for obtaining the vibration amplitude of the forced vibration means obtains the amplitude from a sum signal of the two vibration amplitude detecting means, the means for detecting the vibration amplitude of the vibration generated by the Coriolis force obtains the amplitude from a differential signal of the two vibration amplitude detecting means, and the mass flow rate computing means computes the flow rate of the fluid flowing through the pipeline from the ratio of the sum signal and the differential signal.

Further, according to another aspect of the present invention, in the above-mentioned Coriolis flowmeter, the Coriolis flowmeter further includes two vibration amplitude detecting means for detecting the vibration amplitude of the Coriolis vibration generated by the Coriolis force generated by the forced vibration, the two vibration amplitude detecting means are arranged to be capable of effectively removing the vibration component of the forced vibration, a noise vibration from outside, and vibrations other than the rotational vibration of the vibration axis of the Coriolis vibration, the vibration amplitude of the vibration around the vibration axis of the Coriolis vibration being obtained by obtaining a differential signal of the two vibration amplitude detecting means, the Coriolis flowmeter further includes two vibration amplitude detecting means for detecting the vibration amplitude of the forced vibration means, and the two vibration amplitude detecting means are arranged to be capable of effectively removing a vibration from outside and vibrations other than the rotational vibration around the vibration axis of the forced vibration, the amplitude of the forced vibration being obtained by obtaining a differential signal of the two vibration amplitude detecting means.

Further, according to another aspect of the present invention, in the above-mentioned Coriolis flowmeter, two pipelines through which the fluid flow are provided, the fluid flowing through the pipelines in parallel and in the same direction, the pipelines, the forced vibration means, a frame of the means for suppressing a higher-order vibration, the means for obtaining a vibration amplitude, etc. are provided in plane symmetry, and the forced vibration is effected in opposite directions as in the case of a tuning fork, reducing the influence of an extraneous vibration and the transmission of the forced vibration to the exterior.

Further, according to another aspect of the present invention, in the above-mentioned Coriolis flowmeter, the vibration amplitude detecting means is a relative velocity sensor composed of a combination of a magnet and a coil respectively fixed at positions in plane symmetry, and the mass flow rate computing means computes mass flow rate from a velocity amplitude due to the velocity sensor.

Further, according to another aspect of the present invention, in the above-mentioned Coriolis flowmeter, the vibration amplitude detecting means is an angular velocity sensor, and the mass flow rate computing means computes mass flow rate from a velocity amplitude due to the angular velocity sensor.

Further, according to another aspect of the present invention, in the above-mentioned Coriolis flowmeter, the forced vibration means selects for vibration a drive frequency region where a change in sensitivity with respect to a change in the frequency ratio is small.

Further, according to another aspect of the present invention, in the above-mentioned Coriolis flowmeter, the vibration amplitude detecting means is an acceleration sensor, and that the mass flow rate computing means computes mass flow rate from an acceleration amplitude due to the acceleration sensor.

Further, according to another aspect of the present invention, in the above-mentioned Coriolis flowmeter, the Coriolis flowmeter further includes a signal processing means for performing phase detection based on a drive frequency at the time of measurement of the vibration amplitude to eliminate the influence of frequencies other than the frequency of the vibration due to the Coriolis force and the influence of vibration phases other than the phase generated by the Coriolis vibration.

Further, according to another aspect of the present invention, in the above-mentioned Coriolis flowmeter, the pipeline through which the fluid to be measured flows is a U-shaped tube supported at both proximal end portions, and the Coriolis flowmeter further includes: a forced vibration frame arranged between two straight pipe portions of the U-shaped tube to be parallel to the straight pipe portions and supporting a forward end portion of the U-shaped tube; a forced vibration means for vibrating the forced vibration frame; a Coriolis vibration frame supported by the forced vibration frame and supporting the two straight pipe portions; and a vibration amplitude detecting means provided at both ends of the Coriolis vibration frame.

Further, according to another aspect of the present invention, in the above-mentioned Coriolis flowmeter, the forced vibration frame has a cutout in the vibrating direction, the cutout forming the vibration center of the forced vibration frame.

Further, according to another aspect of the present invention, in the above-mentioned Coriolis flowmeter, the Coriolis flowmeter further includes: means for controlling the forced vibration in the forced vibration controlling means to cause a resonance at a natural frequency in the forced vibration direction from comparison of the phase of a drive voltage and the phase of the forced vibration and the value of the amplitude of the forced vibration; and a computing means for performing correction on a change in a calibration coefficient to be expected based on the value of the natural frequency of the forced vibration, which is changed when the density of the fluid to be tested is changed, from a previously stored correction coefficient equation or correction coefficient table.

Further, according to another aspect of the present invention, in the above-mentioned Coriolis flowmeter, the weight distribution of the frame, etc. and the piping configuration are set so that the respective rates of change of the moment of inertia in the Coriolis vibration direction and the moment of inertia of the forced vibration are the same with respect to a change in density, and the ratio of the natural frequency in the forced vibration direction and the Coriolis natural frequency in the Coriolis vibration direction does not change with respect to a change in the density of the fluid.

Further, according to another aspect of the present invention, in the above-mentioned Coriolis flowmeter, the Coriolis flowmeter further includes: a suppressing means for suppressing the Coriolis vibration such that, when the frequency of the forced vibration is one time or more as high as the Coriolis natural frequency, the vibration amplitude of the Coriolis vibration detected is of a magnitude as stored when the flow rate is zero; and means for computing the flow rate by using the magnitude of the energy input to the suppressing means, the value of the vibration amplitude of the forced vibration, and the value of the drive frequency.

Further, according to another aspect of the present invention, in the above-mentioned Coriolis flowmeter, the Coriolis flowmeter further includes means for performing temperature measurement at a main elastically deformable portion influencing the natural frequency of the forced vibration and the natural frequency in the Coriolis vibration direction, and a computing means for correcting the elastic coefficient based on the temperature measured to correct the calibration coefficient of the flowmeter.

Further, according to another aspect of the present invention, in the above-mentioned Coriolis flowmeter, the fluid flow is not divided in the Coriolis flowmeter and is allowed to flow in at an inlet of one pipeline and pass through one pipeline before flowing out to be connected to an inlet of the other pipeline through a return flow path, flowing out of the flowmeter after having passed through the other pipeline.

Further, according to another aspect of the present invention, in the above-mentioned Coriolis flowmeter, the Coriolis flowmeter further includes means for monitoring and computing the respective outputs of the pipelines connected in series, any abnormality in the flowmeter being diagnosed through judgment of the relationship between the respective output values.

Further, according to another aspect of the present invention, in the above-mentioned Coriolis flowmeter, the Coriolis flowmeter further includes: a branching pipe for dividing the fluid flow substantially equally, the fluid flows entering the two pipes separately; and a joint pipe at which the fluid flows are joined again after having passed through the pipelines before flowing out of the flowmeter, with the flow paths being arranged in parallel.

Further, according to another aspect of the present invention, in the above-mentioned Coriolis flowmeter, in calibrating the Coriolis flowmeter, calibration is performed for a plurality of flow rates different from the detection value output from each pipeline when the fluid flow is stopped and the flow rate is zero, and, to calculate the calibration coefficient for each of the pipelines existing in plane symmetry from the results of the calibration of the plurality of flow rates, the relationship between the calibration results, the calibration coefficients, and the measured values is calculated by solving simultaneous equations.

Further, according to another aspect of the present invention, in the above-mentioned Coriolis flowmeter, in calibrating the Coriolis flowmeter, the temperature measurement means is provided for each pipeline, when the temperature of the elastically deformable portion influencing the frequency of each pipeline differs, temperature correction is conducted individually on pipelines 1 and 2 to achieve an enhancement in correction accuracy.

Further, according to another aspect of the present invention, in the above-mentioned Coriolis flowmeter, the Coriolis flowmeter further includes: a pipeline equipped with at least two straight pipe portions which are parallel to each other and through which the fluid flows in different directions; a first lateral frame and a second lateral frame respectively supporting the end portions of the two straight pipe portions; a longitudinal frame supporting middle portions of the first frame and the second frame and arranged between the two straight pipe portions in parallel to the straight pipe portions; a support base fixing a middle portion of the longitudinal frame and supporting the longitudinal frame to allow axial vibration; a forced vibration means for vibrating the longitudinal frame; and two vibration amplitude detecting means fixed to both ends of one of the lateral frames.

BEST MODE FOR CARRYING OUT THE INVENTION

In the following, embodiments of the present invention based on the basic idea as described above will be described. FIG. 2 shows a first embodiment of the present invention. A U-shaped tube 11 has straight pipe portions 12 and 13, which are supported by a Coriolis vibration frame 16 composed of two parallel reinforcing plates 14 and 15, and acceleration sensors 17 and 18 are fixed to the end portions of the vibration frame 16 to be situated between the reinforcing plates 14 and 15. Instead of the acceleration sensors 14 and 15, it is also possible to use velocity sensors. Further, a forced vibration frame 19 supporting the Coriolis vibration frame 16 to allow vibration is fixed to the middle portion of the reinforcing plates 14 and 15 and at a central position between the straight pipe portions 12 and 13 of the U-shaped tube, that is, at the torsional center of the U-shaped tube 11.

In this device, the Coriolis vibration frame 16, which is composed of the reinforcing plates 14 and 15 for effecting reinforcement with respect to the twisting direction of the U-shaped tube 11, is supported in the Coriolis vibration direction at a certain degree of spring constant ($K_\theta$), and the forced vibration frame 19 can be supported by a support base 22 at a spring constant ($K_\theta$) larger than that. By making exclusively the spring constant in the forced vibration direction from the support base 22 very large, it is possible to realize a frequency ratio of 1 or more (more preferably 1.5 or more, for instance, and, most preferably 5 or more). Apart from the support base as shown in the figure, it is also possible to adopt one simply composed of a piping support member, one having perfectly the same U-shaped tube in plane symmetry using a plane parallel to the plane of the U-shaped tube as a reference plane, etc. This also applies to the various Coriolis flowmeters described below.

Any system can be adopted as the system in which the forced vibration frame 19 supports the Coriolis vibration frame 16 as long as the natural frequency of the forced vibration is several times or more as high as the Coriolis frequency. The system shown may be replaced by a system in which a rotation shaft fixed to the Coriolis vibration frame is supported by a bearing fixed to the forced vibration frame.

A vibration exciter 20 made of an electro magnetic coil is placed between the forced vibration frame 19 and the support base 22, or the vibration member of a counter balance with the same natural frequency, or a pipe in plane symmetry, and is caused to vibrate at a natural frequency, whereby the U-shaped tube is caused to make a forced vibration in the bending direction through the forced vibration frame 19. The Coriolis force generated causes the Coriolis vibration frame 16 to vibrate in the torsional direction.

Through differential vibrations of the two acceleration sensors 17 and 18 fixed to the Coriolis vibration frame 16, the angular acceleration of the Coriolis oscillatory rotation is measured. A signal corresponding to the sum total of the signals from the two acceleration sensors indicates the magnitude of the acceleration of the forced vibration. The frequency of the forced vibration obtained through addition of the detection-demodulated effective amplitude at the drive frequency of the differential signal related to the Coriolis vibration is divided by the effective amplitude detection-demodulated at the drive frequency, and computed with the value of the drive frequency, the calibration correction value, etc., whereby the mass flow rate can be calculated. This will be described in detail below with reference to FIGS. 5(a) and 5(b).

Further, the measurement of the amplitude of the forced vibration can be omitted by strictly controlling the excitation amplitude and maintaining it at a fixed level. Further, the two acceleration sensors can be replaced by a single angular acceleration sensor. In this case, there is mounted a separate acceleration sensor or velocity sensor for measuring the amplitude of the forced vibration.

This device differs from conventional U-shaped type devices in that the width b is made as small as possible to make as small as possible the moment of inertia in the direction θ, that the pipe wall thickness can be made large unlike in an ordinary Coriolis flowmeter for the phase difference time measurement method since there is no need to reduce the spring constant in the twisting direction, and that while in an ordinary U-shaped tube the spring constant in the twisting direction (the Coriolis vibration direction) is larger than the natural frequency in the bending direction (forced vibration direction), the natural frequency in the bending direction is made larger through appropriate contrivance of the configuration of the support frame.

Further, in this embodiment, in order that the influence of the spring constant due to the piping may be diminished to make the predominant spring other than the piping, the forced vibration bending portion (cutout) is formed at a ⅓ distance of the piping between the Coriolis vibration frame to be elastically deformed and the support base, whereby the bending moment generated at the piping proximal end portions of the Coriolis vibration frame is minimized.

In the Coriolis flowmeter described above, signals from the two acceleration sensors 17 and 18 are processed by a mass flow rate computation circuit as shown, for example, in FIG. 5(a). In the example shown in FIG. 5(a), signals from acceleration meters 61 and 62 serving as the acceleration sensors are input respectively to a differential amplifier 63 and an adder 64 to obtain signals of the waveforms as shown in the figure, which are respectively output to lock-in amplifiers 65 and 66 serving as synchronous demodulators. A vibration generation signal 67 as a drive signal for a vibration generator 72 for causing the Coriolis flowmeter to make a forced vibration is input to each of the lock-in amplifiers 65 and 66, and this is used as a synchronizing signal.

Phase information and amplitude signals from the lock-in amplifiers 65 and 66 are output to a mass flow rate computing portion 70, and a differential signal from the differential amplifier 63 is converted here to an amplitude signal in proportion to the Coriolis torsional vibration through detection output at a phase of 90 degrees. Similarly, an addition signal from the adder 64 is converted to an amplitude signal in proportion to the forced vibration at a phase of 0 degrees, and, by performing division as shown in the figure in the mass flow computing portion 70, the mass flow rate is computed. In this process, as in the case of the lock-in amplifiers mentioned above, the vibration generation signal 67 is used as a synchronizing signal.

In the example shown, a signal from the acceleration meter 62 is input to a variable amplifier 69, and, by using this signal, adjustment is effected on the amplification factor of the vibration generation signal 67 for effecting forced vibration. Thereafter, it is amplified as a drive signal at the power amplifier 71 to drive a vibration exciter 72, thereby causing the Coriolis flowmeter to make a forced vibration.

By using the above signal processing circuit, it is possible to easily and accurately compute the ratio of the amplitude of the Coriolis vibration and the amplitude of the forced vibration by using signals from the acceleration meters provided at two portions undergoing Coriolis vibration in opposite directions.

In the example of the signal processing circuit shown in FIG. 5(b), two acceleration sensors for Coriolis vibration detection and forced vibration detection are provided for one pipe, that is, there are mounted four acceleration sensors in total. When four acceleration sensors are arranged, the two acceleration sensors 17 and 18 for Coriolis vibration detection are provided at positions as near as possible to the extension of the rotation axis O of the forced vibration so that they may be as free as possible from the influence of the forced vibration. The signals from the acceleration sensors are input as signals from acceleration meters 61 and 62 and, by measuring the amplitude of the differential signal thereof by the lock-in amplifier, the amplitude of the Coriolis vibration is measured. This helps to remove a common mode noise signal which is allowed to be mixed into the signal due, for example, to vertical vibration of the flowmeter as a whole. Further, since it is installed at a position where a large acceleration due to forced vibration is not easily generated, it is possible to use an acceleration sensor of a small range suitable for the magnitude of the amplitude of the Coriolis vibration to be measured, making it possible to achieve a satisfactory resolution for measurement. The acceleration sensors for forced vibration detection are installed at two positions on the forced vibration frame at different distances from the rotation axis O. The signals from these are input as signals from acceleration sensors 74 and 75 of FIG. 5(b), and, after removal of a common noise signal through the differential signal thereof, the amplitude of the forced vibration is measured by the lock-in amplifier.

FIG. 3 shows a straight type Coriolis flowmeter according to a second embodiment of the present invention. Through a variation in the piping wall thickness, this flowmeter is divided into a bending portion that can be easily deformed and a frame portion that may be substantially regarded as a rigid frame.

A Coriolis vibration portion 25 at the center is formed as a thin-walled portion so that it can swing through Coriolis vibration. A support member 27 made capable of swinging there causes it to vibrate at a frequency higher than the Coriolis frequency. As a result, the pipes on the right-hand and left-hand sides are caused to vibrate vertically. This is based on the same principle as the conventionally used straight type Coriolis flowmeter shown in FIG. 12. However, due to the provision of the bending portion and the frame portion, a higher-mode vibration is not easily generated if excited at a frequency higher than the natural frequency of the piping or the natural frequency of the vibration of the Coriolis vibration frame at the center.

Due to the swinging motion, rigid frames 28 and 29 on the right-hand and left-hand sides receive Coriolis forces vertically opposite to each other. Thus, when there is some flow rate in the pipe, the Coriolis vibration portion 25 at the center makes vertical movements while swinging. In the embodiment shown in the drawing, a rotational angular acceleration is detected through a difference between two acceleration sensors 30 and 31 fixed to the Coriolis vibration portion 25. Instead of the two acceleration sensors 30 and 31, it is also possible to provide a single angular acceleration sensor on the side surface.

Since it is of a straight type, this embodiment involves very little pressure loss, and the size of the flowmeter does not become excessively large if the pipe diameter is increased. Further, it provides a satisfactory washability, etc.

FIG. 4 shows a Coriolis flowmeter composed of a so-called B-shaped sensor tube according to a third embodiment of the present invention. Although similar in appearance to the one as disclosed in JP 2-5010006 A, this flowmeter differs therefrom in the direction in which the forced vibration is effected.

In the Coriolis flowmeter shown in FIG. 4, substantially the central portion of a longitudinal frame 35 is fixed to a swing support 34 fixed to a base 33, and a first lateral frame 36 extending perpendicularly to the longitudinal frame 35 is fixed to an end portion of the longitudinal frame 35 and a second lateral frame 39 supporting a first outer straight pipe 37 and a second outer straight pipe 38 is fixed to the other end portion of the longitudinal frame 35. Further, fixed in position between the first lateral frame 36 and the second lateral frame 39 is a third lateral frame 42 supporting a first inner straight pipe 40 and a second inner straight pipe 41. Further, in the example shown, the first inner straight pipe 40 and the second inner straight pipe 41 are respectively supported by pipe support members 43 and 44. While this embodiment employs the base 33, it is also possible to support the two pipes without using any such base.

Under the portion of the longitudinal frame 35 nearer to the first lateral frame 36, there is provided a forced vibration drive member 45 and the longitudinal frame 35 is caused to make a forced vibration around a swing center portion 46 of a swing support 34 formed by a cutout. As a result, in the pipe 47 in particular, a Coriolis vibration force is generated in each pipe by the fluid flowing in the direction indicated by arrows in the first outer straight pipe 37 and the second outer straight pipe 38, and, due to the Coriolis vibration force, the first lateral frame 36 and the second lateral frame vibrate.

This vibration causes the first lateral frame 36 to vibrate, and acceleration measurement is performed by acceleration meters 48 and 49 provided at the right-hand and left-hand ends of the first lateral frame 36. The processing of signals from the acceleration meters 48 and 49 is the same as that in the above-described embodiments, so that a description thereof will be omitted. In this Coriolis flowmeter, it is easy to adjust the ratio of the moment of inertia in the forced vibration direction and the moment of inertia in the Coriolis direction. Further, the spring constant in the forced vibration direction is determined at the cutout at the center, and the forced vibration frame above it supports the Coriolis vibration frame such that a natural frequency lower than the natural frequency of the forced vibration is attained.

INDUSTRIAL APPLICABILITY

As described above, the Coriolis flowmeter of the present invention can be effectively utilized in fields where the mass flow rate measurement of a low density fluid, which cannot be measured by a conventional flowmeter, is required, in particular, in the field of a hydrogen filling device for a fuel cell powered vehicle requiring mass flow measurement under ultra high pressure. Further, the Coriolis flowmeter of the present invention can be effectively utilized in the field of gas measurement under normal pressure, of which a rapid increase in demand is expected. In particular, the Coriolis flowmeter of the present invention is applicable to the field of flow rate measurement of a low density gas, such as hydrogen, the flow rate measurement field where long term stability is required and the measurement accuracy must be high as in the field related to the transaction of petrol, natural gas, etc., or the fields of environmental analysis, medical care, semiconductor manufacturing, etc.

BRIEF DESCRIPTION OF THE DRAWINGS

FIG. 1 is a graph and a diagram showing the relationship between the sensitivity characteristics and the frequency ratio, indicating the characteristics and features of the present invention.

FIGS. 5(a)-(b) are block diagrams showing two examples of the measurement signal processing system of the present invention.

FIGS. 6(a)-(d) are graphs showing experiment examples based on the present invention.

FIGS. 7(a)-(b) are diagrams illustrating the principle of a Coriolis flowmeter using a U-shaped tube.

FIGS. 9(a) through 9(c) are a plan view, a side view, and a front view, respectively, of the Coriolis flowmeter in the operating state.

FIG. 10(a) is a diagram sequentially illustrating the vibration state of the Coriolis flowmeter, and FIG. 10(b) is a graph showing the vibration phases as measured.

FIGS. 11(a) and 11(b) are graphs illustrating the relationship between the natural frequency ratio, which is the ratio of the drive frequency ratio to the Coriolis frequency, and the sensitivity in the phase difference time measurement method.

FIGS. 12(a)-(b) are diagrams illustrating the operating principle of a straight type Coriolis flowmeter.

Figure 2:
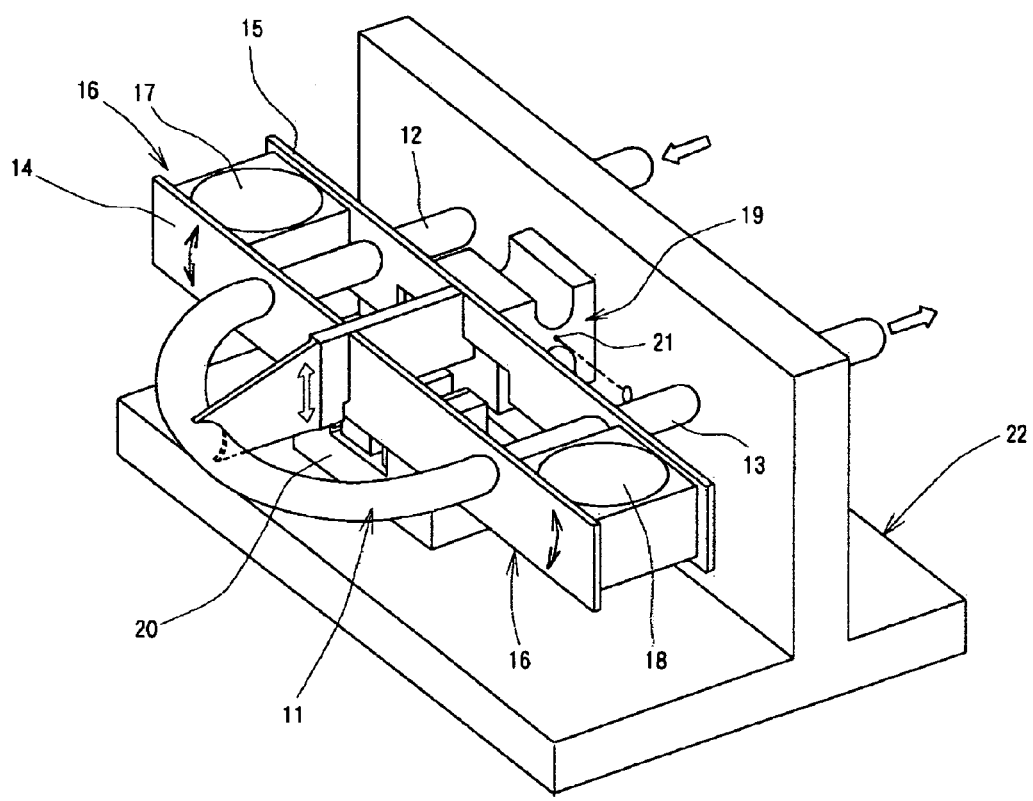
FIG. 2 is a perspective view of an embodiment of the present invention as applied to a U-shaped Coriolis flowmeter.
Figure 3:
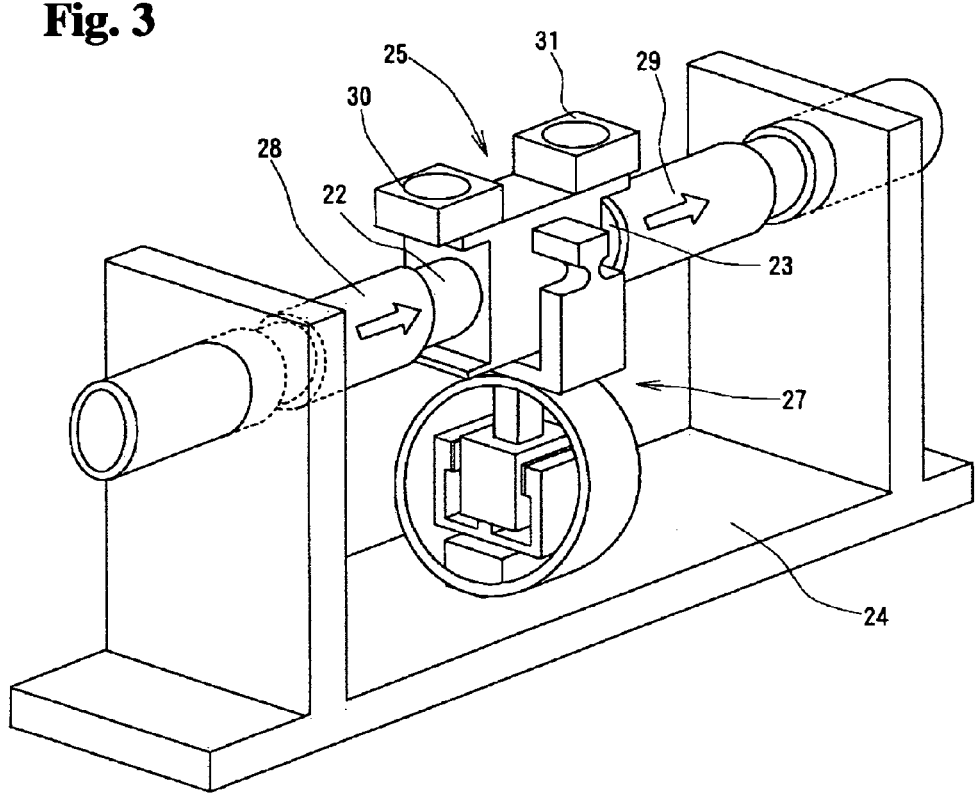
FIG. 3 is a perspective view of an embodiment of the present invention as applied to a straight type Coriolis flowmeter.
Figure 4:
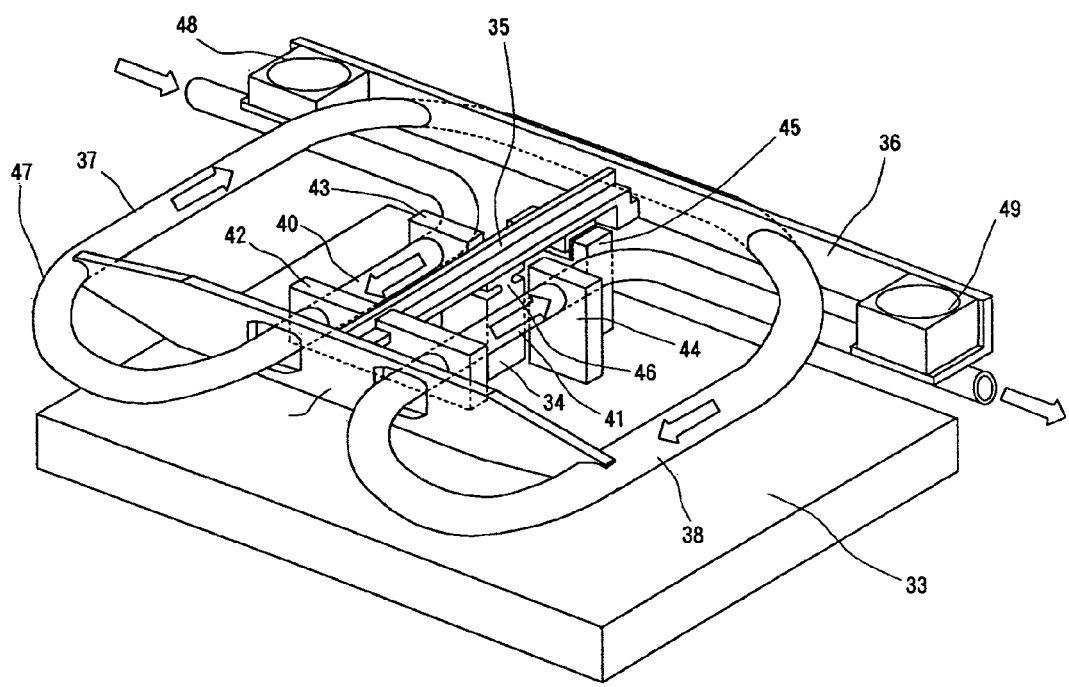
FIG. 4 is a perspective view of an embodiment of the present invention as applied to a B-shaped Coriolis flowmeter.
Figure 8:
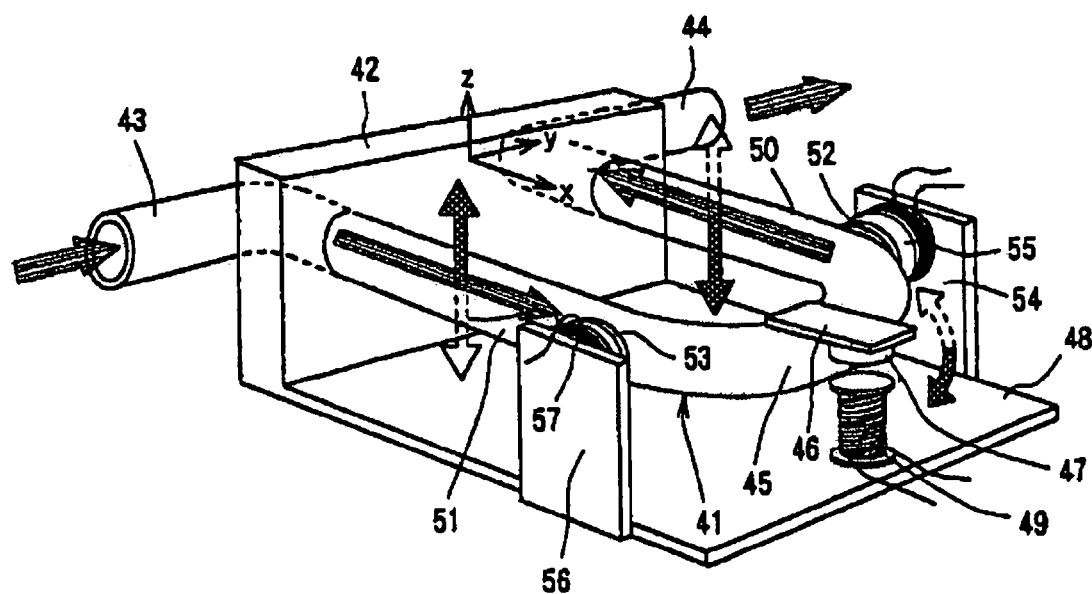
FIG. 8 is a perspective view of an example of a Coriolis flowmeter using a U-shaped tube.

The invention claimed is:

1. A Coriolis flowmeter comprising:
   a forced vibration means for vibrating from outside a pipeline through which a fluid to be tested flows and generating a fine rotational vibration in the fluid to generate a Coriolis force in the fluid;
   means for suppressing a higher-order vibration by limiting a Coriolis vibration which vibrates with a vibration axis different from the vibration axis of a forced vibration and which is induced by the Coriolis force to a vibration close to a one-axis vibration with respect to the vibration direction of the Coriolis vibration through a combination of a rigid frame which is not easily deformed and an elastically deformable portion which is subject to deformation;
   a forced vibration control means for effecting driving at a drive frequency that makes a frequency of the forced vibration of the pipeline caused by the forced vibration means be one time or more as high as a Coriolis natural frequency that is a natural frequency in a direction of the Coriolis vibration;
   means for obtaining a vibration amplitude of the forced vibration generated by the forced vibration means;
   means for obtaining a vibration amplitude of the Coriolis vibration generated by the Coriolis force generated by the forced vibration; and
   a mass flow rate computing means for computing a flow rate of the fluid flowing through the pipeline from a ratio of the amplitude of the forced vibration caused in the pipeline by the forced vibration means and the amplitude of the Coriolis vibration generated by the Coriolis force and a value of the frequency of the forced vibration.

2. A Coriolis flowmeter according to claim 1, further comprising two vibration amplitude detecting means for detecting an amplitude of a vibration of the pipeline generated by Coriolis forces in directions opposite to each other generated by the forced vibration, characterized in that:
   the means for obtaining the vibration amplitude of the forced vibration means obtains the amplitude from a sum signal of the two vibration amplitude detecting means;
   the means for detecting the vibration amplitude of the vibration generated by the Coriolis force obtains the amplitude from a difference signal of the two vibration amplitude detecting means; and
   the mass flow rate computing means computes the flow rate of the fluid flowing through the pipeline from the ratio of the sum signal and the difference signal.

3. A Coriolis flowmeter according to claim 1, further comprising two vibration amplitude detecting means for detecting the vibration amplitude of the Coriolis vibration generated by the Coriolis force generated by the forced vibration, characterized in that:
   the two vibration amplitude detecting means are arranged to be capable of effectively removing vibrations other than the vibration component of the forced vibration, a noise vibration from outside, and a rotational vibration of the vibration axis of the Coriolis vibration, the vibration amplitude of the vibration around the vibration axis of the Coriolis vibration being obtained by obtaining a difference signal of the two vibration amplitude detecting means;
   the Coriolis flowmeter further comprises two additional vibration amplitude detecting means for detecting the vibration amplitude of the forced vibration means; and
   the two additional vibration amplitude detecting means are arranged to be capable of effectively removing vibrations other than a vibration from outside and the rotational vibration around the vibration axis of the forced vibration, the amplitude of the forced vibration being obtained by obtaining a difference signal of the two additional vibration amplitude detecting means.

4. A Coriolis flowmeter according to claim 1, further comprising:
   two pipelines through which the fluid flow are provided, the fluid flowing through the pipelines in parallel and in the same direction;
   same structures such as the pipelines, the forced vibration means, a frame of the means for suppressing a higher-order vibration, the means for obtaining a vibration amplitude are provided in plane symmetry; and
   the forced vibration is effected in opposite directions as in the case of a tuning fork, reducing the influence of an extraneous vibration and the transmission of the forced vibration to the exterior.

5. A Coriolis flowmeter according to claim 4, characterized in that the vibration amplitude detecting means is a relative velocity sensor composed of a combination of a magnet and a coil respectively fixed at positions in plane symmetry, and that the mass flow rate computing means computes mass flow rate from a velocity amplitude due to the velocity sensor.

6. A Coriolis flowmeter according to claim 5, characterized in that the forced vibration means selects for vibration a drive frequency region where a change in sensitivity with respect to a change in the frequency ratio is small.

7. A Coriolis flowmeter according to claim 4, characterized in that the fluid flow is not divided in the Coriolis flowmeter and is allowed to flow in at an inlet of one pipeline and pass through one pipeline before flowing out to be connected to an inlet of the other pipeline through a return flow path, flowing out of the flowmeter after having passed through the other pipeline.

8. A Coriolis flowmeter according to claim 7, further comprising means for monitoring and computing the respective outputs of the pipelines connected in series, any abnormality in the flowmeter being diagnosed through judgment of the relationship between the respective output values.

9. A Coriolis flowmeter according to claim 4, further comprising:

a branching pipe for dividing the fluid flow substantially equally, the fluid flows entering the two pipes separately; and a joint pipe at which the fluid flows are joined again after having passed through the pipelines before flowing out of the flowmeter, with the flow paths being arranged in parallel.

10. A calibration method for the Coriolis flowmeter according to claim 9, comprising:
   performing a plurality of calibrations for different flow rates; and
   calculating the calibration coefficients of respective pipelines by solving simultaneous equations prepared by using the flow rate values obtained by the plurality of calibrations, output values of the respective pipelines at the time of the calibrations, and the output values of the respective pipelines obtained when fluid flows are stopped to reduce the flow rates to zero, which are performed separately from the calibrations.

11. A Coriolis flowmeter according to claim 4, further comprising means for performing temperature measurement at a main elastically deformable portion influencing the natural frequency of the forced vibration and the natural frequency in the Coriolis vibration direction, and a computing means for correcting the elastic coefficient based on the temperature measured to correct the calibration coefficient of the flowmeter, characterized in that the temperature measurement means is provided for each pipeline in the Coriolis flowmeter, and that, when the temperature of the elastically deformable portion influencing the frequency of each pipeline differs, temperature correction is conducted individually on the pipelines to achieve an enhancement in correction accuracy.

12. A Coriolis flowmeter according to claim 1, characterized in that the vibration amplitude detecting means is an angular velocity sensor, and that the mass flow rate computing means computes mass flow rate from a velocity amplitude due to the angular velocity sensor.

13. A Coriolis flowmeter according to claim 1, characterized in that the vibration amplitude detecting means is an acceleration sensor, and that the mass flow rate computing means computes mass flow rate from an acceleration amplitude due to the acceleration sensor.

14. A Coriolis flowmeter according to claim 1, further comprising a signal processing for performing phase detection based on a drive frequency at the time of measurement of the vibration amplitude to eliminate the influence of frequencies other than the frequency of the vibration due to the Coriolis force and the influence of vibration phases other than the phase generated by the Coriolis vibration.

15. A Coriolis flowmeter according to claim 1, characterized in that the pipeline through which the fluid to be measured flows is a U-shaped tube supported at both proximal end portions,
   the Coriolis flowmeter further comprising:
   a forced vibration frame arranged between two straight pipe portions of the U-shaped tube to be parallel to the straight pipe portions and supporting a forward end portion of the U-shaped tube;
   a forced vibration means for vibrating the forced vibration frame;
   a Coriolis vibration frame supported by the forced vibration frame and supporting the two straight pipe portions; and
   a vibration amplitude detecting means provided at both ends of the Coriolis vibration frame.

16. A Coriolis flowmeter according to claim 15, characterized in that the forced vibration frame has a cutout in the vibrating direction, the cutout forming the vibration center of the forced vibration frame.

17. A Coriolis flowmeter according to claim 1, further comprising:
   means for controlling the forced vibration in the forced vibration controlling means to cause a resonance at a natural frequency in the forced vibration direction from comparison of the phase of a drive voltage and the phase of the forced vibration and the value of the amplitude of the forced vibration; and
   a computing means for performing correction on a change in a calibration coefficient to be expected based on the value of the natural frequency of the forced vibration, which is changed when the density of the fluid to be tested is changed, from a previously stored correction coefficient equation or correction coefficient table.

18. A Coriolis flowmeter according to claim 1, characterized in that the weight distribution of the frame, etc. and the piping configuration are set so that the respective rates of change of the moment of inertia in the Coriolis vibration direction and the moment of inertia of the forced vibration are the same with respect to a change in density, and that the ratio of the natural frequency in the forced vibration direction and the Coriolis natural frequency in the Coriolis vibration direction does not change with respect to a change in the density of the fluid.

19. A Coriolis flowmeter according to claim 1, further comprising:
   a suppressing means for suppressing the Coriolis vibration so that, when the frequency of the forced vibration is one time or more as high as the Coriolis natural frequency, the vibration amplitude of the Coriolis vibration detected is of a magnitude as stored when the flow rate is zero;
   means for computing the flow rate by using the magnitude of the energy input to the suppressing means, the value of the vibration amplitude of the forced vibration, and the value of the drive frequency.

20. A Coriolis flowmeter according to claim 1, further comprising means for performing temperature measurement at a main elastically deformable portion influencing the natural frequency of the forced vibration and the natural frequency in the Coriolis vibration direction, and a computing means for correcting the elastic coefficient based on the temperature measured to correct the calibration coefficient of the flowmeter.

21. A Coriolis flowmeter according to claim 1, further comprising:
   a pipeline equipped with at least two straight pipe portions which are parallel to each other and through which the fluid flows in different directions;
   a first lateral frame and a second lateral frame respectively supporting the end portions of the two straight pipe portions;
   a longitudinal frame supporting middle portions of the first frame and the second frame and arranged between the two straight pipe portions in parallel to the straight pipe portions;
   a support base fixing a middle portion of the longitudinal frame and supporting the longitudinal frame to allow axial vibration;
   a forced vibration means for vibrating the longitudinal frame; and
   two vibration amplitude detecting means fixed to both ends of one of the lateral frames.

* * * * *